(12) United States Patent
Chakraborty et al.

(10) Patent No.: US 11,108,170 B2
(45) Date of Patent: Aug. 31, 2021

(54) MULTI-BAND MILLIMETER-WAVE (MMW) ANTENNA ARRAY AND RADIO-FREQUENCY INTEGRATED CIRCUIT (RFIC) MODULE

(71) Applicant: Qualcomm Incorporated, San Diego, CA (US)

(72) Inventors: Kaushik Chakraborty, San Diego, CA (US); Rahul Malik, San Diego, CA (US); Jeremy Dunworth, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 16/178,189

(22) Filed: Nov. 1, 2018

(65) Prior Publication Data

US 2020/0144733 A1    May 7, 2020

(51) Int. Cl.
*H01Q 1/22* (2006.01)
*H01Q 21/30* (2006.01)
(Continued)

(52) U.S. Cl.
CPC ........... *H01Q 21/30* (2013.01); *H01Q 1/2283* (2013.01); *H01Q 1/243* (2013.01); *H01Q 1/40* (2013.01);
(Continued)

(58) Field of Classification Search
CPC ........... H01Q 21/30; H01Q 5/28; H01Q 5/35; H01Q 5/50; H01Q 1/243; H01Q 1/40;
(Continued)

(56) References Cited

U.S. PATENT DOCUMENTS 8,854,277 B2 * 10/2014 De Graauw ........... H01Q 23/00
343/904
9,196,951 B2 * 11/2015 Baks .................... H01Q 1/2283
(Continued)

OTHER PUBLICATIONS

International Search Report and Written Opinion—PCT/US2019/057861—ISA/EPO—dated Feb. 6, 2020.
(Continued)

*Primary Examiner* — Tho G Phan
(74) *Attorney, Agent, or Firm* — Qualcomm Incorporated

(57) ABSTRACT

An apparatus is disclosed for a multi-band millimeter-wave (mmW) antenna array and radio-frequency integrated circuit (RFIC) module. In an example aspect, the apparatus includes a multi-band mmW antenna array and RFIC module with a first antenna array, a second antenna array, and at least one radio-frequency front-end integrated circuit. The first antenna array includes at least two first antenna elements and is tuned to a first mmW frequency band. The second antenna array includes at least two second antenna elements and is tuned to a second mmW frequency band. The at least one radio-frequency front-end integrated circuit includes at least two first transceiver chains and at least two second transceiver chains. The at least two first transceiver chains are respectively coupled to the at least two first antenna elements, and the at least two second transceiver chains are respectively coupled to the at least two second antenna elements.

30 Claims, 25 Drawing Sheets

(51) Int. Cl.
*H01Q 5/28* (2015.01)
*H01Q 5/35* (2015.01)
*H01Q 5/50* (2015.01)
*H01Q 1/24* (2006.01)
*H01Q 1/40* (2006.01)
*H01Q 21/24* (2006.01)

(52) U.S. Cl.
CPC .............. *H01Q 5/28* (2015.01); *H01Q 5/35* (2015.01); *H01Q 5/50* (2015.01); *H01Q 21/245* (2013.01)

(58) Field of Classification Search
CPC .......... H01Q 21/245; H01Q 1/22; H01Q 1/24; H01Q 21/24; H01Q 1/2283
USPC ........................................................ 343/702
See application file for complete search history.

(56) References Cited

U.S. PATENT DOCUMENTS

| | | | | |
|---|---|---|---|---|
| 9,472,859 | B2* | 10/2016 | Dang | H01Q 21/0075 |
| 9,608,313 | B2* | 3/2017 | Kim | H01L 23/66 |
| 9,860,760 | B2 | 1/2018 | Tarighat Mehrabani et al. | |
| 10,205,224 | B2* | 2/2019 | Mow | H01Q 9/0421 |
| 10,601,494 | B2* | 3/2020 | Vannucci | H04B 7/15507 |
| 2012/0309325 | A1 | 12/2012 | Carbone et al. | |
| 2015/0214633 | A1 | 7/2015 | Pan | |
| 2016/0178730 | A1 | 6/2016 | Trotta et al. | |
| 2016/0366683 | A1 | 12/2016 | Park et al. | |
| 2017/0062952 | A1 | 3/2017 | Sundararajan et al. | |
| 2017/0222613 | A1 | 8/2017 | Yehezkely et al. | |
| 2017/0294705 | A1 | 10/2017 | Khripkov et al. | |
| 2018/0026341 | A1* | 1/2018 | Mow | H04B 10/90 343/702 |
| 2018/0026377 | A1 | 1/2018 | Trotta et al. | |
| 2018/0090816 | A1* | 3/2018 | Mow | H01Q 9/0421 |
| 2018/0167130 | A1* | 6/2018 | Vannucci | H04B 7/0617 |
| 2019/0267710 | A1 | 8/2019 | Jenwatanavet et al. | |
| 2019/0319364 | A1 | 10/2019 | Yang et al. | |
| 2020/0091608 | A1* | 3/2020 | Alpman | H01Q 1/38 |
| 2020/0169291 | A1* | 5/2020 | Cho | H01Q 1/38 |

OTHER PUBLICATIONS

Hong W., et al., "Millimeter-Wave 5G Antennas for Smartphones: Overview and Experimental Demonstration", IEEE Transactions on Antennas and Propagation, Dec. 2017, vol. 65, No. 12, pp. 6250-6261.

Sadhu B., et al., "A 28-GHz 32-Element TRX Phased-Array IC With Concurrent Dual-Polarized Operation and Orthogonal Phase and Gain Control for 5G Communications", Dec. 2017, vol. 52, No. 12, pp. 3373-3391.

Jensen J., "Practical 5G mmWave Solutions", CICC—Intel Corporation, May 1, 2017, 46 pages.

* cited by examiner

MULTI-BAND MILLIMETER-WAVE (MMW) ANTENNA ARRAY AND RADIO-FREQUENCY INTEGRATED CIRCUIT (RFIC) MODULE

TECHNICAL FIELD

This disclosure relates generally to antenna arrays and wireless transceivers, and more specifically, to a joint antenna array and radio-frequency integrated circuit (RFIC) design that realizes a multi-band millimeter-wave (mmW) antenna array and RFIC module.

BACKGROUND

Electronic devices use radio-frequency (RF) signals to communicate information. These radio-frequency signals enable users to talk with friends, download information, share pictures, remotely control household devices, and receive global positioning information. Some electronic devices include multiple antenna arrays to transmit and receive communication signals at different frequencies or along different directions. However, due to size constraints of some electronic devices, a quantity of antenna arrays that can be implemented may be limited. As a result, an electronic device may be limited in terms of a quantity of frequency bands it can support or an amount of spatial coverage it can provide at any one time or in a given physical orientation.

SUMMARY

An apparatus is disclosed that implements a multi-band millimeter-wave (mmW) antenna array and radio-frequency integrated circuit (RFIC) module. Positioning multiple multi-band mmW antenna array and RFIC modules around a device enables a target spatial coverage to be provided for one or more millimeter-wave frequency bands. The disclosed multi-band mmW antenna array and RFIC module has a compact design enabling multiple multi-band mmW antenna array and RFIC modules to be included within a space-constrained device. The multi-band mmW antenna array and RFIC module can be used to perform multiple-input multiple-output (MIMO) operations, carrier aggregation, or to utilize multiple millimeter-wave frequency bands. The multi-band mmW antenna array and RFIC module can also support multiple polarizations by using two sets of single-polarized antenna elements or dual-polarized antenna elements. The multi-band mmW antenna array and RFIC module includes at least two antenna arrays and at least one radio-frequency front-end integrated circuit that are jointly architected to conserve a space occupied by the multi-band mmW antenna array and RFIC module without adversely impacting performance of the multi-band mmW antenna array and RFIC module.

In an example aspect, an apparatus is disclosed. The apparatus includes a multi-band millimeter-wave (mmW) antenna array and radio-frequency integrated circuit (RFIC) module. The multi-band mmW antenna array and RFIC module includes a first antenna array, a second antenna array, and at least one radio-frequency front-end integrated circuit. The first antenna array includes at least two first antenna elements and is tuned to a first mmW frequency band. The second antenna array includes at least two second antenna elements and is tuned to a second mmW frequency band. The at least one radio-frequency front-end integrated circuit includes at least two first transceiver chains and at least two second transceiver chains. The at least two first transceiver chains are respectively coupled to the at least two first antenna elements, and the at least two second transceiver chains are respectively coupled to the at least two second antenna elements.

In an example aspect, an apparatus is disclosed. The apparatus includes a multi-band millimeter-wave (mmW) antenna array and radio-frequency integrated circuit (RFIC) module. The multi-band mmW antenna array and RFIC module includes a first antenna array and a second antenna array. The first antenna array is configured to respond to first signals associated with a first mmW frequency band. The second antenna array is configured to respond to second signals associated with a second mmW frequency band. The multi-band mmW antenna array and RFIC module also includes a radio-frequency front-end integrated circuit coupled to the first antenna array and the second antenna array. The radio-frequency front-end integrated circuit includes first partition means for conditioning the first signals associated with the first mmW frequency band. The radio-frequency front-end integrated circuit also includes second partition means for conditioning the second signals associated with the second mmW frequency band.

In an example aspect, a method for operating a multi-band millimeter-wave (mmW) antenna array and radio-frequency integrated circuit (RFIC) module is disclosed. The method includes responding to a first signal associated with a first mmW frequency band via a first antenna array of the multi-band mmW antenna array and RFIC module. The method also includes conditioning the first signal associated with the first mmW frequency band via a radio-frequency front-end integrated circuit of the multi-band mmW antenna array and RFIC module. The method additionally includes responding to a second signal associated with a second mmW frequency band via a second antenna array of the multi-band mmW antenna array and RFIC module. The method further includes conditioning the second signal associated with the second mmW frequency band via the radio-frequency front-end integrated circuit.

In an example aspect, an apparatus is disclosed. The apparatus includes a multi-band millimeter-wave (mmW) antenna array and radio-frequency integrated circuit (RFIC) module including a first antenna array, a second antenna array, a first radio-frequency front-end integrated circuit, and a second radio-frequency front-end integrated circuit. The first antenna array includes at least two first antenna elements and is tuned to a first mmW frequency band. The second antenna array includes at least two second antenna elements and is tuned to a second mmW frequency band. The first radio-frequency front-end integrated circuit includes at least two first transceiver chains that are respectively coupled to the at least two first antenna elements. The second radio-frequency front-end integrated circuit includes at least two second transceiver chains that are respectively coupled to the at least two second antenna elements.

BRIEF DESCRIPTION OF DRAWINGS

FIG. 4-1 illustrates example antenna arrays for implementing a multi-band mmW antenna array and RFIC module.

FIG. 4-2 illustrates an example single-polarized antenna element for implementing a multi-band mmW antenna array and RFIC module and two example implementations thereof.

FIG. 4-3 illustrates an example dual-polarized antenna element for implementing a multi-band mmW antenna array and RFIC module and two example implementations thereof.

FIG. 5-1 illustrates an example non-interleaved partitioning of a radio-frequency front-end integrated circuit for implementing a multi-band mmW antenna array and RFIC module.

FIG. 5-2 illustrates an example arrangement of multiple transceiver chains associated with different polarizations within a radio-frequency front-end integrated circuit for implementing a multi-band mmW antenna array and RFIC module.

FIG. 5-3 illustrates another example arrangement of multiple transceiver chains associated with different polarizations within a radio-frequency front-end integrated circuit for implementing a multi-band mmW antenna array and RFIC module.

FIG. 5-4 illustrates an additional example arrangement of multiple transceiver chains associated with different polarizations within a radio-frequency front-end integrated circuit for implementing a multi-band mmW antenna array and RFIC module.

FIG. 5-5 illustrates an example interleaved partitioning of a radio-frequency front-end integrated circuit for implementing a multi-band mmW antenna array and RFIC module.

FIG. 5-6 illustrates an example arrangement of multiple transceiver chains associated with different polarizations within a radio-frequency front-end integrated circuit for implementing a multi-band mmW antenna array and RFIC module.

FIG. 5-7 illustrates another example arrangement of multiple transceiver chains associated with different polarizations within a radio-frequency front-end integrated circuit for implementing a multi-band mmW antenna array and RFIC module.

FIG. 5-8 illustrates example implementations of transceiver chains within a radio-frequency front-end integrated circuit for implementing a multi-band mmW antenna array and RFIC module.

FIG. 6-1 illustrates an example arrangement of antenna arrays and a radio-frequency front-end integrated circuit for implementing a multi-band mmW antenna array and RFIC module.

FIG. 6-2 illustrates an example arrangement of multiple multi-band mmW antenna array and RFIC modules for implementing large linear antenna arrays.

FIG. 6-3 illustrates an example arrangement of multiple multi-band mmW antenna array and RFIC modules for implementing two-dimensional antenna arrays.

FIG. 7-1 illustrates an example routing for a multi-band mmW antenna array and RFIC module including dual-polarized patch antenna elements and a radio-frequency front-end integrated circuit with non-interleaved partitioning.

FIG. 7-2 illustrates another example routing for a multi-band mmW antenna array and RFIC module including dual-polarized cross-patch antenna elements and a radio-frequency front-end integrated circuit with non-interleaved partitioning.

FIG. 7-3 illustrates an example routing for a multi-band mmW antenna array and RFIC module including single-polarized patch antenna elements and a radio-frequency front-end integrated circuit with non-interleaved partitioning.

FIG. 7-4 illustrates another example routing for a multi-band mmW antenna array and RFIC module including single-polarized patch antenna elements and a radio-frequency front-end integrated circuit with non-interleaved partitioning.

FIG. 7-5 illustrates an example routing for a multi-band mmW antenna array and RFIC module including single-polarized patch antenna elements and a radio-frequency front-end integrated circuit with interleaved partitioning.

FIG. 8-1 illustrates an example implementation of a multi-band mmW antenna array and RFIC module having multiple radio-frequency front-end integrated circuits.

FIG. 8-2 illustrates another example implementation of a multi-band mmW antenna array and RFIC module having multiple radio-frequency front-end integrated circuits.

DETAILED DESCRIPTION

Electronic devices use radio-frequency (RF) signals to communicate information. These radio-frequency signals enable users to talk with friends, download information, share pictures, remotely control household devices, receive global positioning information, employ radar for object detection and tracking, listen to radio stations, and so forth. Some electronic devices include multiple antenna arrays to transmit and receive communication signals at different frequencies or along different directions. However, due to size constraints of some electronic devices, a quantity of antenna arrays that can be deployed within a given electronic device may be limited. As a result, an electronic device may be limited in terms of a quantity of frequency bands it can support or an amount of spatial coverage that can be realized.

To address such challenges, techniques for implementing a multi-band millimeter-wave (mmW) antenna array and radio-frequency integrated circuit (RFIC) module are described herein. Positioning multiple multi-band mmW antenna array and RFIC modules around a device enables a target spatial coverage to be provided for one or more millimeter-wave frequency bands. The described multi-band mmW antenna array and RFIC module has a compact design enabling multiple multi-band mmW antenna array and RFIC modules to be included within space-constrained devices. The multi-band mmW antenna array and RFIC module can be used to perform multiple-input multiple-output (MIMO) operations, carrier aggregation, or to utilize multiple millimeter-wave frequency bands. The multi-band mmW antenna array and RFIC module can also support multiple polarizations by using single-polarized antenna elements or dual-polarized antenna elements. The multi-band mmW antenna array and RFIC module includes at least two antenna arrays and at least one radio-frequency front-end integrated circuit that are jointly architected to conserve a space occupied by the multi-band mmW antenna array and RFIC module without adversely impacting performance of the multi-band mmW antenna array and RFIC module.

Figure 1:
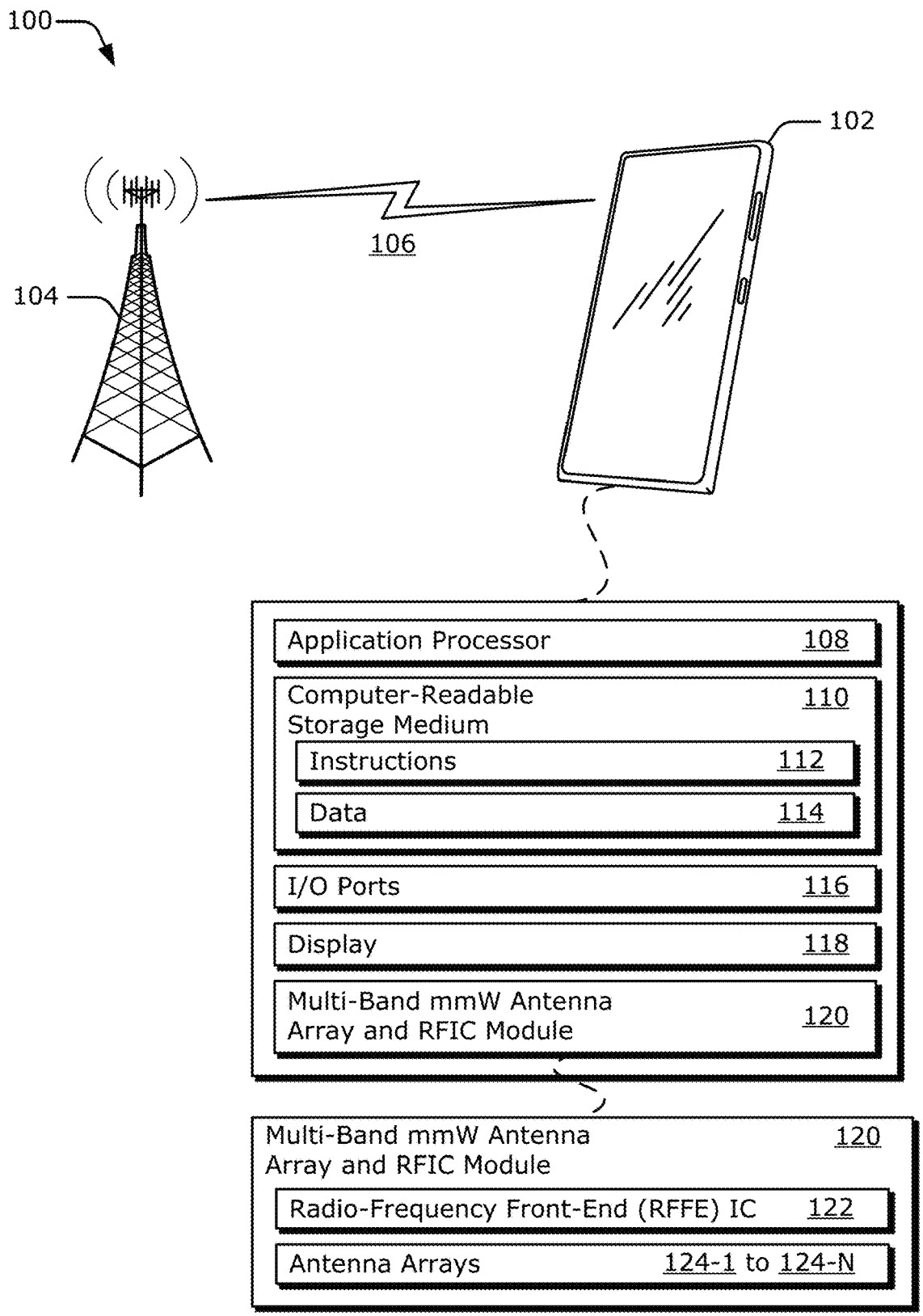
FIG. 1 illustrates an example operating environment that utilizes a multi-band millimeter-wave (mmW) antenna array and radio-frequency integrated circuit (RFIC) module.

FIG. 1 illustrates an example environment 100 that utilizes a multi-band mmW antenna array and RFIC module. In the example environment 100, a computing device 102 communicates with a base station 104 through a wireless communication link 106 (wireless link 106). In this example, the computing device 102 is depicted as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radar, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, and so forth. The computing device 102 may communicate with the base station 104 via a wireless connection, for example in the same or different frequency band as the wireless link 106, or a wired connection, or a combination thereof. The computing device 102 may also communicate with another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as fourth-generation (4G), fifth-generation (5G), IEEE 802.11 (e.g. Wi-Fi™), any satellite communication (SATCOM) standards, IEEE 802.16 (e.g., WiMAX™), and so forth. In some implementations, the wireless link 106 may wirelessly provide power, and the base station 104 may comprise a power source.

As shown, the computing device 102 includes an application processor 108 and a computer-readable storage medium 110 (CRM 110). The application processor 108 may include any type of processor, such as a multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A multi-band mmW antenna array and RFIC module 120 of the computing device 102 provides connectivity to respective networks and other electronic devices connected therewith Additionally, the computing device 102 may include a wired transceiver, such as an Ethernet or fiber optic interface for communicating over a local network, intranet, or the Internet. The multi-band mmW antenna array and RFIC module 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the multi-band mmW antenna array and RFIC module 120 enables the computing device 102 to communicate with the base station 104 and networks connected therewith. However, the multi-band mmW antenna array and RFIC module 120 can also enable the computing device 102 to communicate "directly" with other devices or networks.

The multi-band mmW antenna array and RFIC module 120 includes at least one radio-frequency front-end (RFFE) integrated circuit (IC) 122 (RFFE IC 122) (e.g., a RFIC) and at least two antenna arrays 124-1 to 124-N. The radio-frequency front-end integrated circuit 122 includes circuitry and logic for conditioning signals (e.g., generating or processing signals) that are transmitted and received via the antenna arrays 124-1 to 124-N. Components of the radio-frequency front-end integrated circuit 122 can include amplifiers, switches, mixers, filters, phase shifters, and so forth. In some cases, components of the radio-frequency front-end integrated circuit 122 are implemented as separate receiver and transmitter entities. Additionally or alternatively, the radio-frequency front-end integrated circuit 122 can be realized using multiple or different sections to implement respective receiving and transmitting operations (e.g., separate transmit and receiver chains). In general, the radio-frequency front-end integrated circuit 122 conditions signals associated with communicating data of the computing device 102 over the antenna arrays 124-1 to 124-N. Although not explicitly shown, the radio-frequency front-end integrated circuit 122 may be included as part of a wireless transceiver, which includes other components or integrated circuits, such as an intermediate-frequency integrated circuit or a baseband integrated circuit. The wireless transceiver may also include logic to perform in-phase/quadrature (I/Q) operations, such as synthesis, encoding, modulation, decoding, demodulation, and so forth. Example implementations of the radio-frequency front-end integrated circuit 122 are further described with respect to FIGS. 5-1 to 5-8.

The radio-frequency front-end integrated circuit 122 can include one or more partitions that are respectively associated with a mmW frequency band. As used herein, a frequency band is a substantially continuous portion of the electromagnetic spectrum that may have a dedicated purpose defined by a government and may be publicly or privately owned (e.g., unlicensed or licensed). In some cases, a frequency band may comprise a shared frequency band that is used for carrier aggregation. Examples of a mmW frequency band include the mmW frequency bands for fifth-generation standards, such as a low mmW frequency band (e.g., a frequency band that includes at least a subset of frequencies between approximately 24 to 35 gigahertz (GHz)), a middle mmW frequency band (e.g., a frequency band that includes at least a subset of frequencies between approximately 35 to 50 GHz)), or a high mmW frequency band (e.g., a frequency band that includes at least a subset of frequencies that are between approximately 50 and 300 GHz)).

Each antenna array of the at least two antenna arrays 124-1 to 124-N is tuned to a particular mmW frequency band. In other words, each antenna array is designed to transmit or receive radio-frequency signals having one or more frequencies within the associated mmW frequency band without significantly attenuating the radio-frequency signals. The antenna arrays 124-1 to 124-N can each be coupled to the partition within the radio-frequency front-end integrated circuit 122 that is associated with the particular mmW frequency band, as further described with respect to FIG. 3. Example implementations of the antenna arrays 124-1 to 124-N are further described with respect to FIGS. 4-1 to 4-3.

Within the multi-band mmW antenna array and RFIC module 120, the radio-frequency front-end integrated circuit 122 and the antenna arrays 124-1 to 124-N are jointly architected to conserve space without adversely impacting performance. In particular, designs and placements of the radio-frequency front-end integrated circuit 122 and the antenna arrays 124-1 to 124-N simplify routings within the multi-band mmW antenna array and RFIC module 120 and enable multiple traces to be disposed in a same metal layer. In this manner, the multiple traces do not overlap or cross over each other and the use of vias can be avoided, which improves the performance of the multi-band mmW antenna array and RFIC module 120 compared to other designs that have cross overs or utilize vias. To achieve this, some radio-frequency front-end integrated circuit 122 can be designed to have a symmetrical floorplan, as described in FIGS. 5-1 to 5-6, and placed in a particular location and orientation relative to the antenna arrays 124-1 to 124-2, as shown in FIGS. 6-1 and 7-1 to 7-3. Furthermore, the antenna arrays 124-1 and 124-2 are arranged in a symmetrical fashion, as further described with respect to FIGS. 6-1 and 7-1 to 7-3. As a result, the multi-band mmW antenna array and RFIC module 120 can fit within a smaller form factor of a given computing device 102, such as a portable computing device. Furthermore, the compact design of the multi-band mmW antenna array and RFIC module 120 can enable multiple multi-band mmW antenna array and RFIC modules to be implemented within the computing device 102, as further described with respect to FIG. 2.

Figure 2:
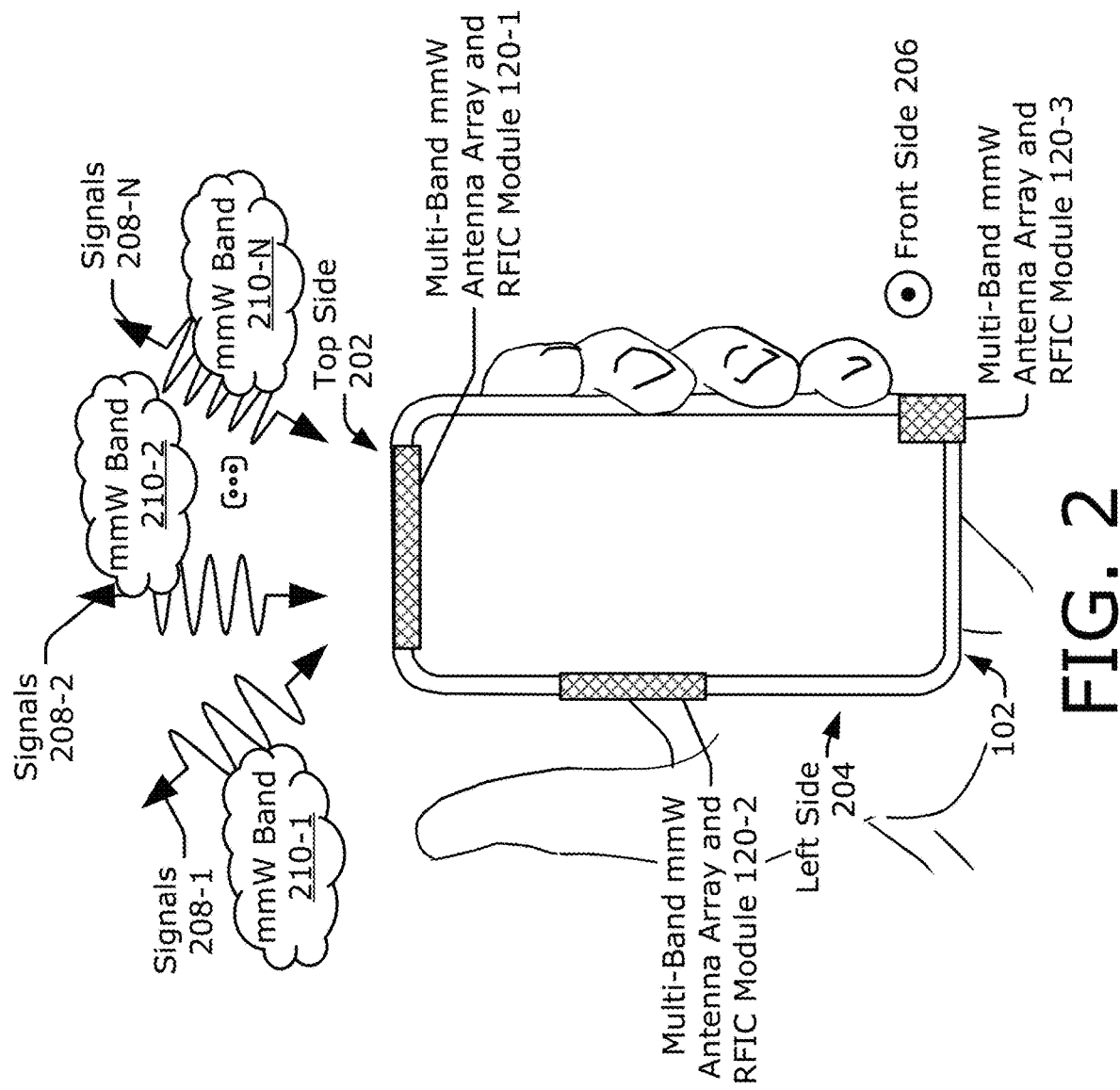
FIG. 2 illustrates an example computing device that includes multiple multi-band mmW antenna array and RFIC modules.

FIG. 2 illustrates an example computing device 102 that includes multiple multi-band mmW antenna array and RFIC modules 120-1 to 120-3. In the depicted configuration, the multi-band mmW antenna array and RFIC modules 120-1 to 120-3 are respectively oriented towards a top side 202, a left side 204, and a front side 206 of the computing device 102. In this manner, the multi-band mmW antenna array and RFIC modules 120-1 to 120-3 can respectively transmit or receive signals along a vertical direction or Y axis, a horizontal direction or X axis, or out of the page along a Z axis. In general, the mmW antenna array and RFIC modules 120-1 to 120-3 may be disposed around the computing device 102 to enabled transmission and reception of signals in any direction relative to the computing device 102.

As described above with respect to FIG. 1, the multi-band mmW antenna array and RFIC module 120-1 to 120-3 can transmit and receive signals 208-1 to 208-N associated with mmW frequency bands 210-1 to 210-N. In general, a quantity of mmW frequency bands that each of the multi-band mmW antenna array and RFIC modules 120-1 to 120-3 supports is based on a quantity of antenna arrays 124-1 to 124-N implemented within each of the multi-band mmW antenna array and RFIC modules 120-1 to 120-3. The multi-band mmW antenna array and RFIC modules 120-2 and 120-3 may support similar or different mmW frequency bands 210-1 to 210-N relative to the multi-band mmW antenna array and RFIC module 120-1. By utilizing multiple multi-band mmW antenna array and RFIC modules 120-1 to 120-3 having different orientations and positioned at different locations within the computing device 102, the computing device 102 may realize a target spatial coverage for one or more mmW frequency bands 210-1 to 210-N.

Control circuitry within the computing device 102 (not shown) may dynamically select which multi-band mmW antenna array and RFIC module 120-1 to 120-3 is used based on a current situation or environment. If the control circuitry determines a portion of one of the multi-band mmW antenna array and RFIC modules 120-1 to 120-3 is obstructed (e.g., by a user's appendage), the control circuitry can cause the computing device 102 to transmit and receive signals via one of the unobstructed multi-band mmW antenna array and RFIC modules 120-1 to 120-3. As another example, the control circuitry can select the multi-band mmW antenna array and RFIC module 120-1 to 120-3 that provides a target spatial coverage along a direction to the base station 104 of FIG. 1 or supports a particular mmW frequency band. The multi-band mmW antenna array and RFIC module 120 is further described with respect to FIG. 3.

Figure 3:
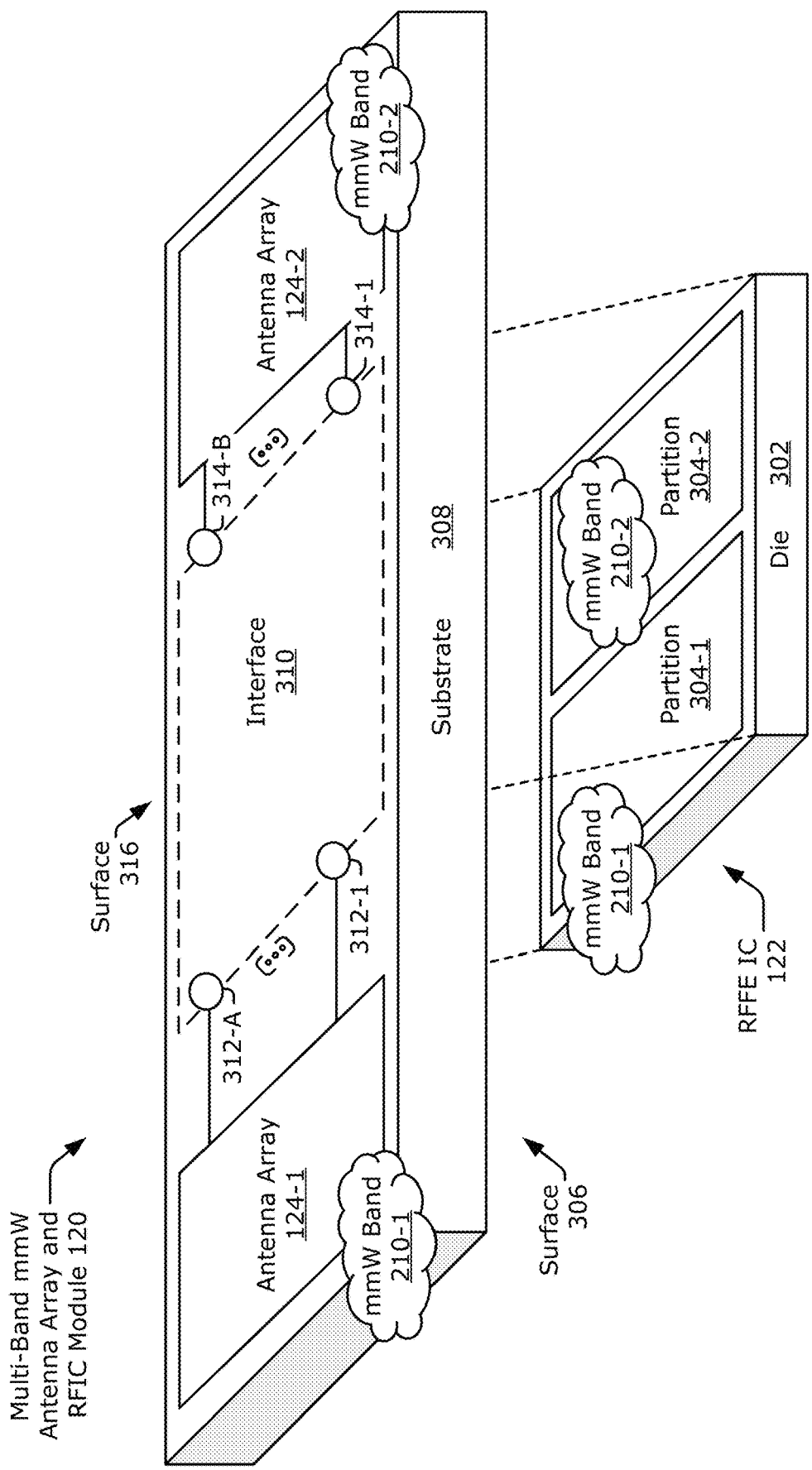
FIG. 3 illustrates an example implementation of a multi-band mmW antenna array and RFIC module.

FIG. 3 illustrates an example implementation of a multi-band mmW antenna array and RFIC module 120. In the depicted configuration, the multi-band mmW antenna array and RFIC module 120 is shown to include one radio-frequency front-end integrated circuit 122 (RFFE IC 122) and two antenna arrays 124-1 to 124-2. In other implementations, the multi-band mmW antenna array and RFIC module 120 may include more than two radio-frequency front-end integrated circuits 122, as shown in FIGS. 8-1 to 8-2, or more than two antenna arrays 124-1 to 124-N.

The radio-frequency front-end integrated circuit 122 is implemented on a die 302 and has a floorplan that is arranged according to partitions 304-1 and 304-2. Each of the partitions 304-1 and 304-2 is associated with a particular mmW frequency band and includes one or more transceiver chains. In this case, the partition 304-1 supports the mmW frequency band 210-1 (e.g., generates or processes signals within the mmW frequency band 210-1), and the partition 304-2 supports the mmW frequency band 210-2 (e.g., generates or processes signals within the mmW frequency band 210-2). In general, a quantity of partitions within the radio-frequency front-end integrated circuit 122 is based on a quantity of mmW frequency bands 210-1 to 210-N that the multi-band mmW antenna array and RFIC module 120 is designed to support or on a quantity of radio-frequency front-end integrated circuits 122 that are implemented within the multi-band mmW antenna array and RFIC module 120.

The radio-frequency front-end integrated circuit 122 can be mounted to a surface 306 of a substrate 308 via an interface 310. The surface 306 is an underside of the substrate 308, which is not visible in FIG. 3. In this manner, the partitions 304-1 and 304-2 face the surface 306 of the substrate 308. The interface 310, which is disposed on the surface 306, is configured to accept and connect to the die 302. The interface 310 includes multiple terminals, which are represented as terminals 312-1 to 312-A and terminals 314-1 to 314-B, where A and B are positive integers that may or may not be equal to each other. The values of A and B are based on respective quantities of feed ports associated with the antenna arrays 124-1 and 124-2. Different types of feed ports are further described with respect to FIGS. 4-2 and 4-3. Although not explicitly depicted, the interface 310 can include other terminals that connect the radio-frequency front-end integrated circuit 122 to other components, such as another integrated circuit that is a part of the wireless transceiver or the control circuitry.

Through the interface 310, the terminals 312-1 to 312-A couple the transceiver chains within the partition 304-1 to the antenna elements of the antenna array 124-1. Likewise, the terminals 314-1 to 314-B couple the transceiver chains within the partition 304-2 to the antenna elements of the antenna array 124-2. In FIG. 3, the antenna arrays 124-1 and 124-2 are disposed on a surface 316 of the substrate 308 (e.g., on a surface that is opposite to the surface that the radio-frequency front-end integrated circuit 122 is mounted to). The surface 316 is an upper side of the substrate 308, which is visible in FIG. 3 and is on an opposite side relative to the surface 306. In this manner, the antenna arrays 124-1 and 124-2 face away from the radio-frequency front-end integrated circuit 122. In other implementations, at least some of the antenna arrays 124-1 to 124-N may be disposed on the surface 306 that the radio-frequency front-end integrated circuit 122 is mounted to. The antenna arrays 124-1 and 124-2 are further described with respect to FIGS. 4-1 to 4-3.

Figures 1, 4:
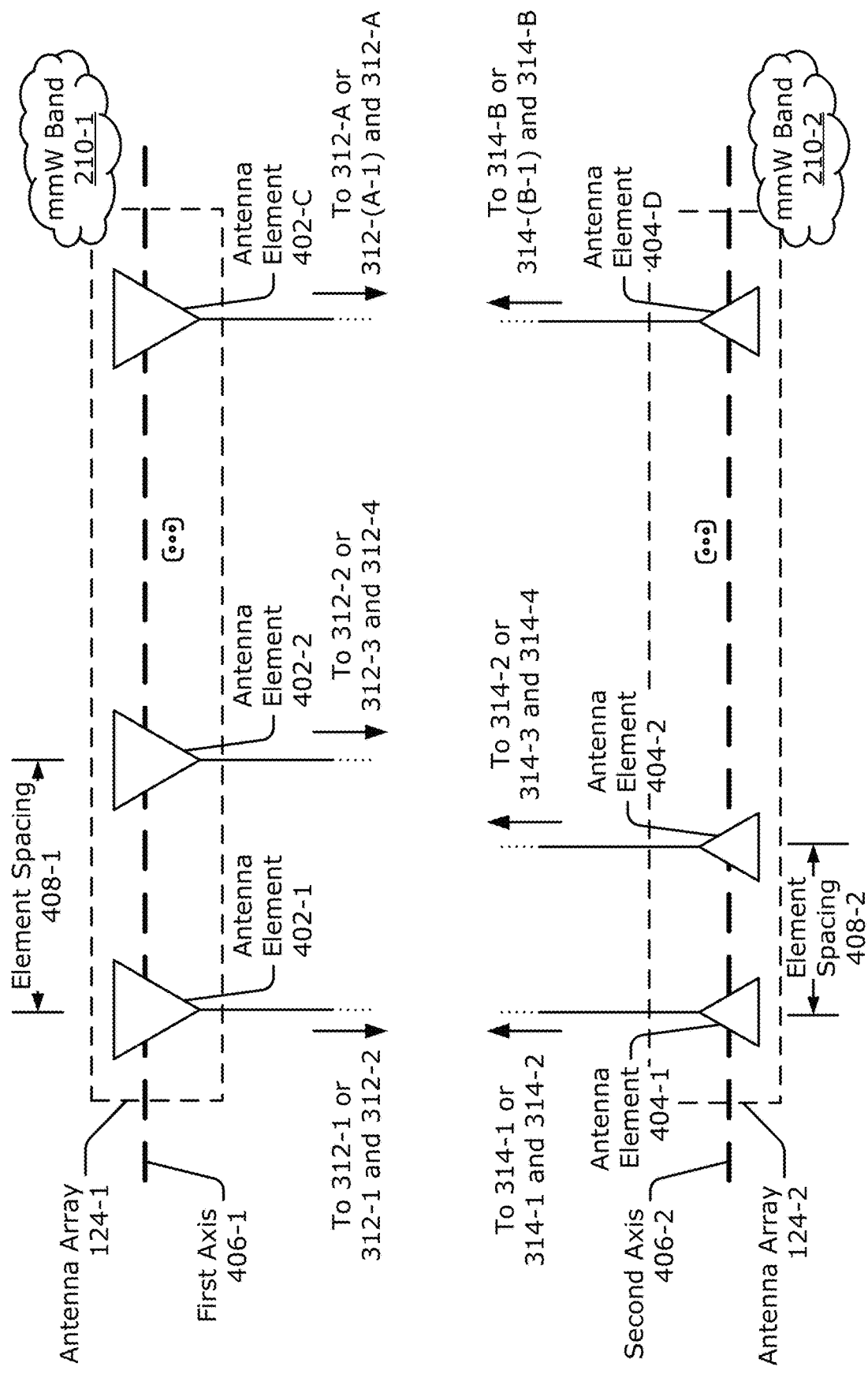
Figures 2, 4:
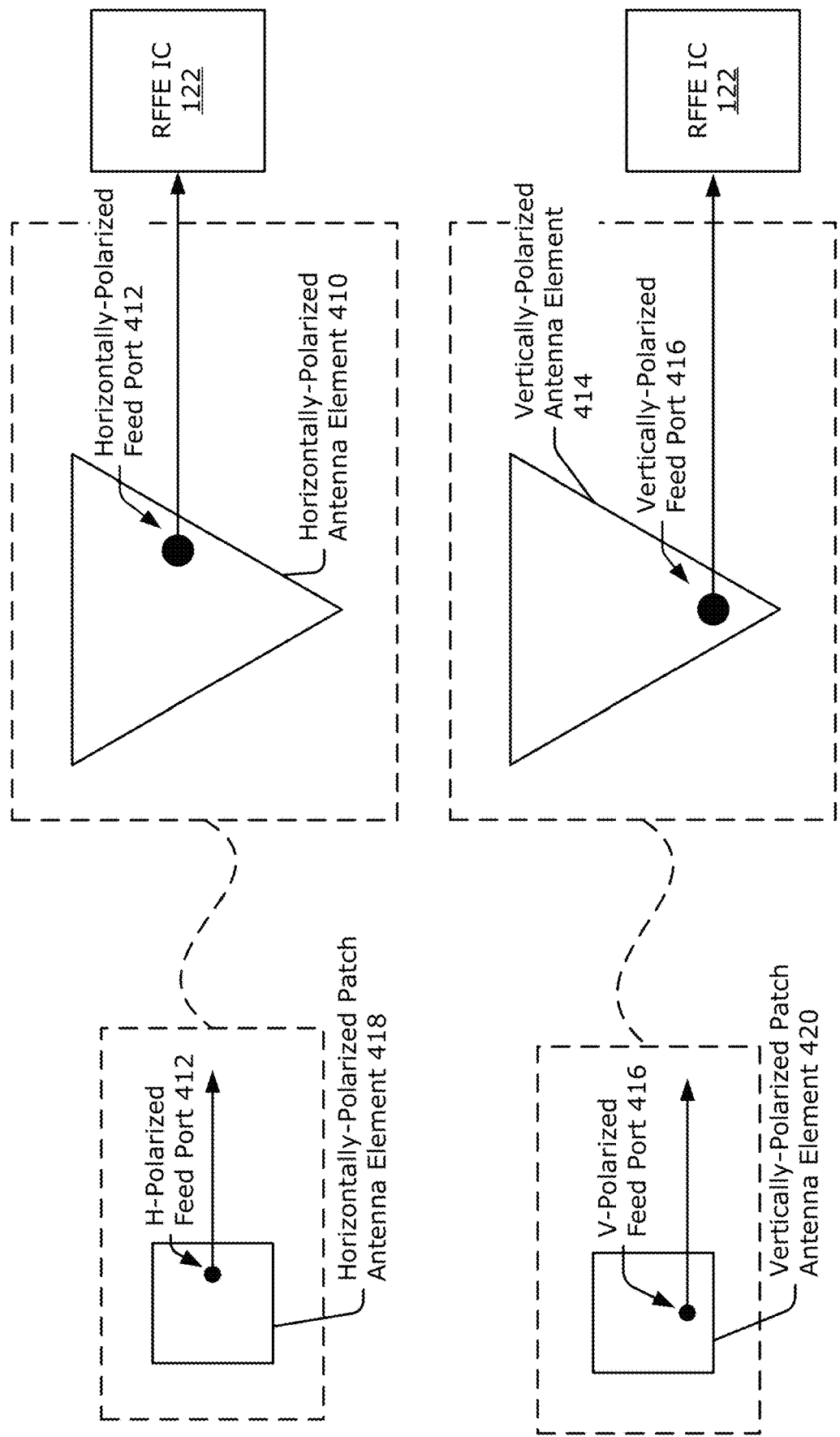
Figures 3, 4:
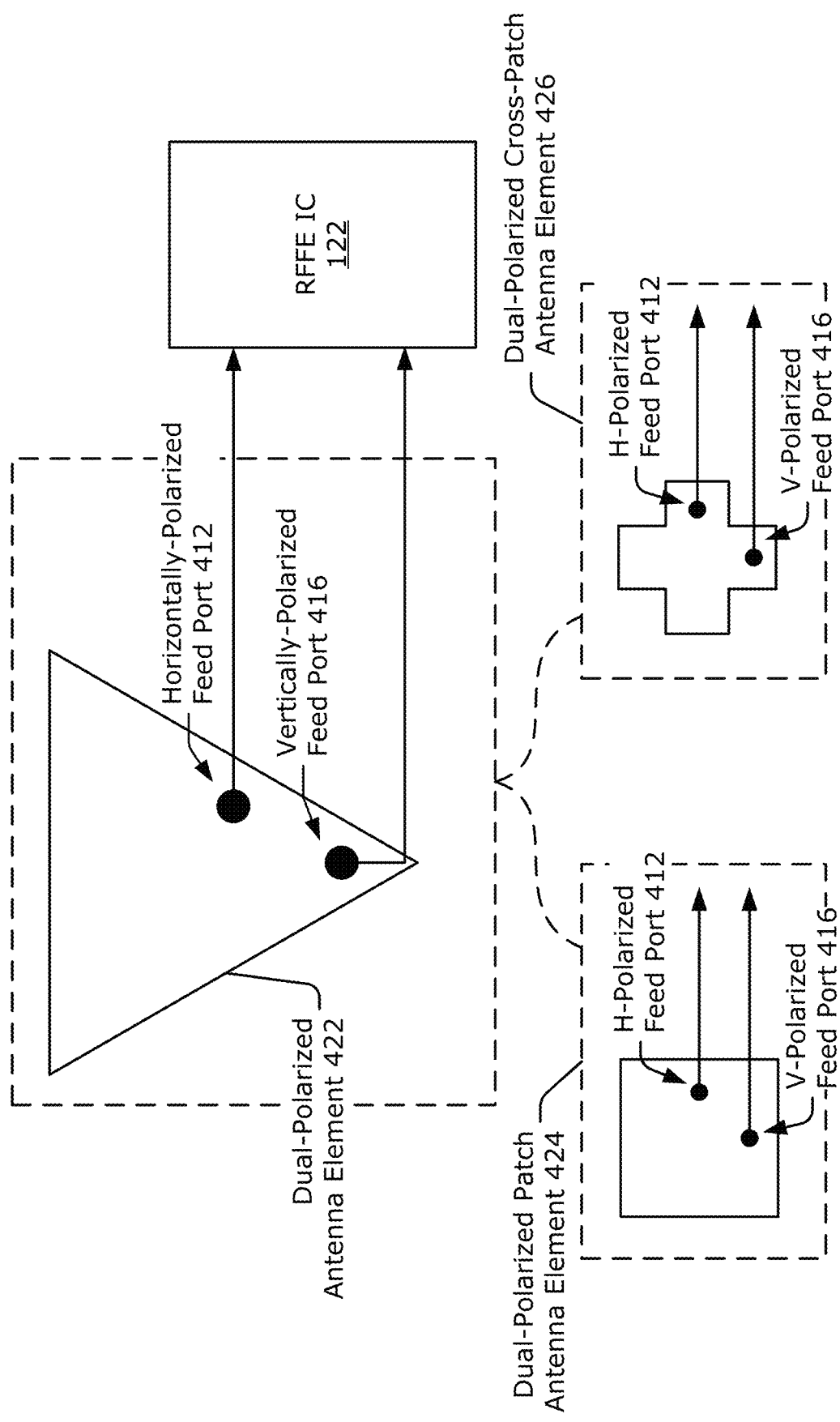

FIG. 4-1 illustrates example antenna arrays 124-1 and 124-2 for implementing the multi-band mmW antenna array and RFIC module 120. In the depicted configuration, the antenna arrays 124-1 and 124-2 are linear arrays. The antenna arrays 124-1 and 124-2 respectively include antenna elements 402-1, 402-2 . . . 402-C and antenna elements 404-1, 404-2 . . . 404-D, where C and D are positive integers that may or may not be equal to A and B, respectively. In this example, the antenna elements 402-1 to 402-C of the antenna array 124-1 are tuned to the mmW frequency band 210-1 and the antenna elements 404-1 to 404-D of the antenna array 124-2 are tuned to the mmW frequency band 210-2. The antenna elements 402-1 to 402-C are arranged along a first axis 406-1 while the antenna elements 404-1 to 404-D are arranged along a second axis 406-2. As shown in FIG. 4-1, the first axis 406-1 and the second axis 406-2 may be approximately parallel to each other. In some implementations, the antenna elements 402-1 to 402-C or the antenna elements 404-1 to 404-D can be arranged along multiple axes, as shown in FIG. 7-3.

The antenna elements 402-1 to 402-C and 404-1 to 404-D can comprise a variety of different types of antenna elements, including patch antenna elements, cross-patch antenna elements (e.g., patch antenna elements in the shape of a cross), slot antenna elements, dipole antenna elements, bowtie antenna elements, crossed bowtie antenna elements, inverted-F antennas, other types of microstrip antenna elements, other types of wire antenna elements, a combination thereof, and so forth. As such, a triangle symbol is used to represent the antenna elements 402-1 to 402-C and 404-1 to 404-D generically in the following figures as any of these types of antenna elements or another type of antenna element.

Within the antenna array 124-1, adjacent antenna elements 402-1 and 402-2 are shown to be separated by an element spacing 408-1. The element spacing 408-1 can based on a particular wavelength that is associated with the mmW frequency band 210-1. Example types of wavelengths can include a center wavelength associated with a center frequency within the mmW frequency band 210-1, a largest wavelength associated with a lowest frequency within the mmW frequency band 210-1, a smallest wavelength associated with a highest frequency within the mmW frequency band, and so forth. The element spacing 408-1 can be approximately equal to a fraction of this particular wavelength. For example, the element spacing 408-1 can be approximately equal to half of the center wavelength (e.g., between approximately 30% to 75% of the center wavelength). Within the antenna array 124-2, adjacent antenna elements 404-1 and 404-2 are shown to be separated by an element spacing 408-2. Similar to the element spacing 408-1, the element spacing 408-2 can be a fraction of a wavelength associated with the mmW frequency band 210-2 (e.g., approximately equal to the center wavelength).

In some implementations, the antenna arrays 124-1 and 124-2 are implemented as uniform antenna arrays. A uniform antenna array has substantially similar antenna element spacings between adjacent elements throughout the antenna array. In other words, variations in antenna element spacings within the respective antenna array 124-1 and 124-2 may be within approximately 1/16 of the respective wavelengths associated with the element spacings 408-1 and 408-2 (e.g., 1/16 of the center wavelengths of the mmW frequency bands 210-1 and 210-2, respectively).

Herein, the mmW frequency band 210-1 is assumed to include frequencies that are lower than those within the mmW frequency band 210-2. In other words, the mmW frequency band 210-1 is a low mmW frequency band and the mmW frequency band 210-2 is a high mmW frequency band, at least relative to each other. Accordingly, the element spacing 408-1 is shown to be larger than the element spacing 408-2, and an overall size of the antenna elements 402-1 to 402-C is shown to be larger than the antenna elements 404-1 to 404-D. In some cases, the mmW frequency band 210-2 includes a frequency that is approximately twice a frequency that is included within the mmW frequency band 210-1 (e.g., the mmW frequency band 210-1 can include a frequency of approximately 24 or 30 GHz and the mmW frequency band 210-2 can include a frequency of approximately 48 or 60 GHz). If wavelengths associated with these frequencies are used to determine the element spacings 408-1 and 408-2, the element spacing 408-1 can be approximately twice as large as the element spacing 408-2. As a result, a dimension of the multi-band mmW antenna array and RFIC module 120 along the first axis 406-1 is substantially based on sizes of the antenna elements 402-1 to 402-C and relative element spacings between the adjacent elements within the antenna array 124-1.

In some cases, a footprint of the antenna array 124-1 along the first axis 406-1 is used to determine a quantity of antenna elements 404-1 to 404-D within the antenna array 124-2 or element spacings between adjacent elements within the antenna array 124-2. In this way, the antenna array 124-2 can have a similar length along the second axis 406-2 as the antenna array 124-1 has along the first axis 406-1. As an example, the antenna array 124-2 can have twice a quantity of antenna elements as the antenna array 124-1 has.

Depending on whether the antenna elements 402-1 to 402-C and 404-1 to 404-D have single feed ports or multiple feed ports, the antenna elements 402-1 to 402-C and 404-1 to 404-D can each be coupled to one or more of the terminals 312-1 to 312-A and 314-1 to 314-B, respectively. To illustrate these different situations, the antenna element 402-1 is shown to be coupled to the terminal 312-1 for single-polarized antenna elements or both the terminals 312-1 and 312-2 for dual-polarized antenna elements. Likewise, the antenna elements 402-2 and 402-C are shown to be coupled respectively to the terminals 312-2 and 312-A, or coupled respectively to both the terminals 312-3 and 312-4 and both the terminals 312-(A-1) and 312-A, respectively. Within the antenna array 124-2, the antenna element 404-1 is shown to be coupled to the terminal 314-1 for single-polarized antenna elements or both the terminals 314-1 and 314-2 for dual-polarized antenna elements. Likewise, the antenna elements 404-2 and 404-D are shown to be coupled respectively to the terminals 314-2 and 314-B, or coupled respectively to both the terminals 314-3 and 314-4 and both the terminals 314-(B-1) and 314-B, respectively. Example types of antenna elements, such as single polarized elements and dual-polarized elements, are further described with respect to FIGS. 4-2 and 4-3.

FIG. 4-2 illustrates an example single-polarized antenna element for implementing the multi-band mmW antenna array and RFIC module 120 and two example implementations thereof. One or more of the antenna elements 402-1 to 402-C and 404-1 to 404-D of FIG. 4-1 can be implemented with a single-polarized antenna element. In general, the single-polarized antenna element has a single feed port, which is coupled to the radio-frequency front-end integrated circuit 122. Using the single feed port, the single-polarized antenna element transmits or receives signals associated with a particular polarization, such as a horizontal polarization or a vertical polarization.

In the top half of FIG. 4-2, the single-polarized antenna element is shown as a horizontally-polarized antenna element 410 with a horizontally-polarized feed port 412. Using the horizontally-polarized feed port 412, the horizontally-polarized antenna element 410 transmits and receives horizontally-polarized signals. In the bottom half of FIG. 4-2, the single-polarized antenna element is shown as a vertically-polarized antenna element 414 with a vertically-polarized feed port 416. Using the vertically-polarized feed port 416, the vertically-polarized antenna element 414 transmits and receives vertically-polarized signals.

Throughout the following figures, the single-polarized antenna element is shown to include a single feed port, which is represented with a single black circle. A placement of the feed port within the single-polarized antenna element indicates a polarization of the feed port. If the feed port is shown on a left side or on a right side of the antenna element, the antenna element corresponds to the horizontally-polarized antenna element 410, and the feed port corresponds to the horizontally-polarized feed port 412. If the feed port is shown on a top side or a bottom side of the antenna element, the antenna element corresponds to the vertically-polarized antenna element 416, and the feed port corresponds to the vertically-polarized feed port 416.

In some implementations, the single-polarized antenna element may be a patch antenna, which is represented herein with a square symbol. Although shown using the square symbol, a shape of the patch antenna may be rectangular, circular, elliptical, pentagonal, and so forth. In FIG. 4-2, the horizontally-polarized antenna element 410 can be implemented as a horizontally-polarized patch antenna element 418, and the vertically-polarized antenna element 414 can be implemented as a vertically-polarized patch antenna element 420. In other implementations, the horizontally-polarized antenna element 410 and the vertically-polarized antenna element 414 may comprise dipole antennas that are respectively oriented along a horizontal axis and a vertical axis. In some cases, the single-polarized antenna elements may be easier or cheaper to implement relative to dual-polarized antenna elements, which are further described with respect to FIG. 4-3.

FIG. 4-3 illustrates an example dual-polarized antenna element 422 for implementing the multi-band mmW antenna array and RFIC module 120 and two example implementations thereof. One or more of the antenna elements 402-1 to 402-C and 404-1 to 404-D of FIG. 4-1 may be implemented with the dual-polarized antenna element 422. In contrast to the types of single-polarized antenna elements shown in FIG. 4-2, the dual-polarized antenna element 422 has two feed ports, such as the horizontally-polarized feed port 412 and the vertically-polarized feed port 416. The feed ports 412 and 416 couple the dual-polarized antenna element 422 to the radio-frequency front-end integrated circuit 122. Using the feed ports 412 and 416, the dual-polarized antenna element 422 can transmit or receive signals associated with a horizontal polarization, a vertical polarization, a horizontal polarization and a vertical polarization, or a circular polarization. In the bottom half of FIG. 4-3, the dual-polarized antenna element 422 is shown to be implemented as a dual-polarized patch antenna element 424 or a dual-polarized cross-patch antenna element 426. The feed ports 412 or 416 of the antenna elements 402-1 to 402-C and 404-1 to 404-D are coupled to respective ports of the radio-frequency front-end integrated circuit 122, as further described with respect to FIGS. 5-1 to 5-8.

Figures 1, 5:
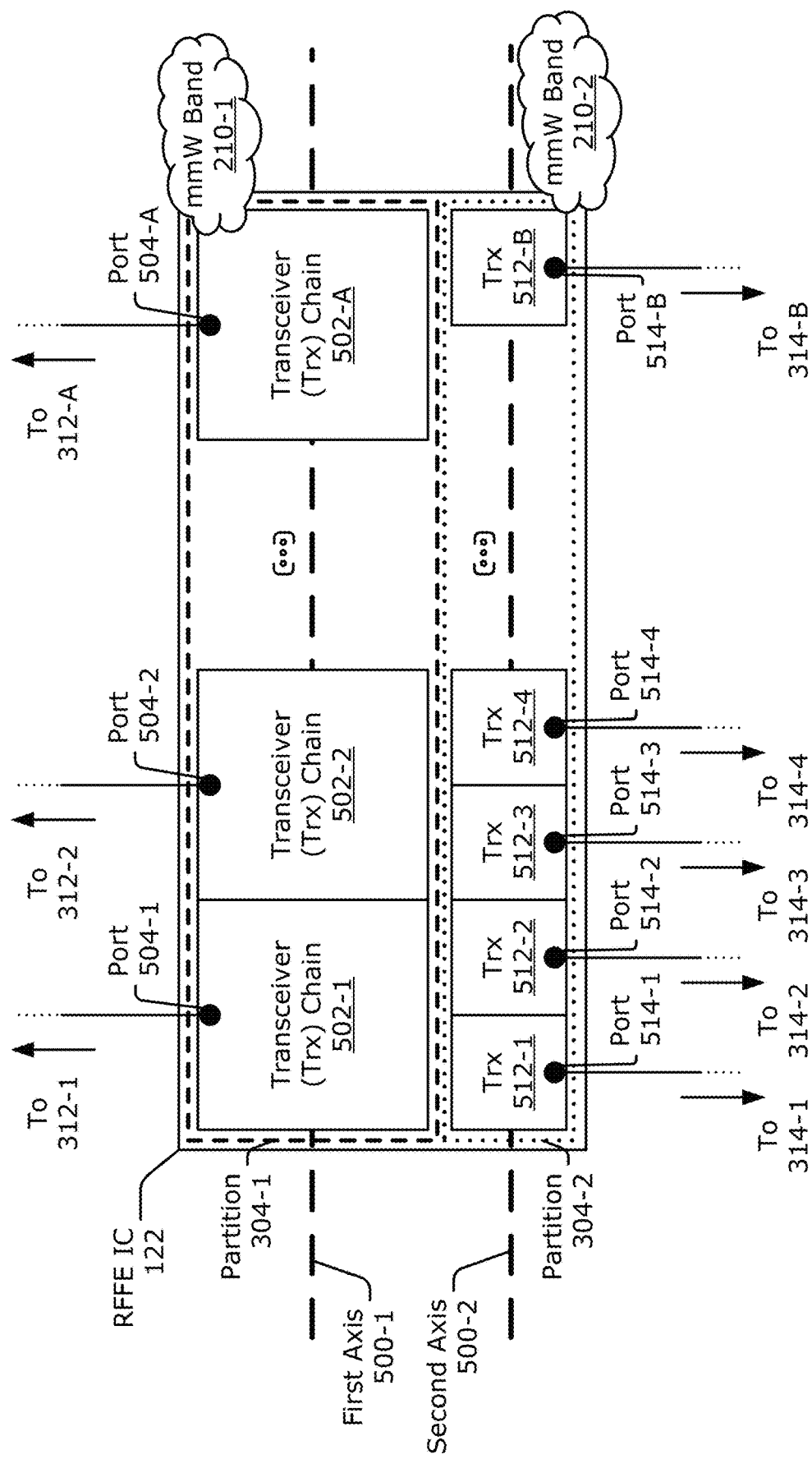
Figures 2, 5:
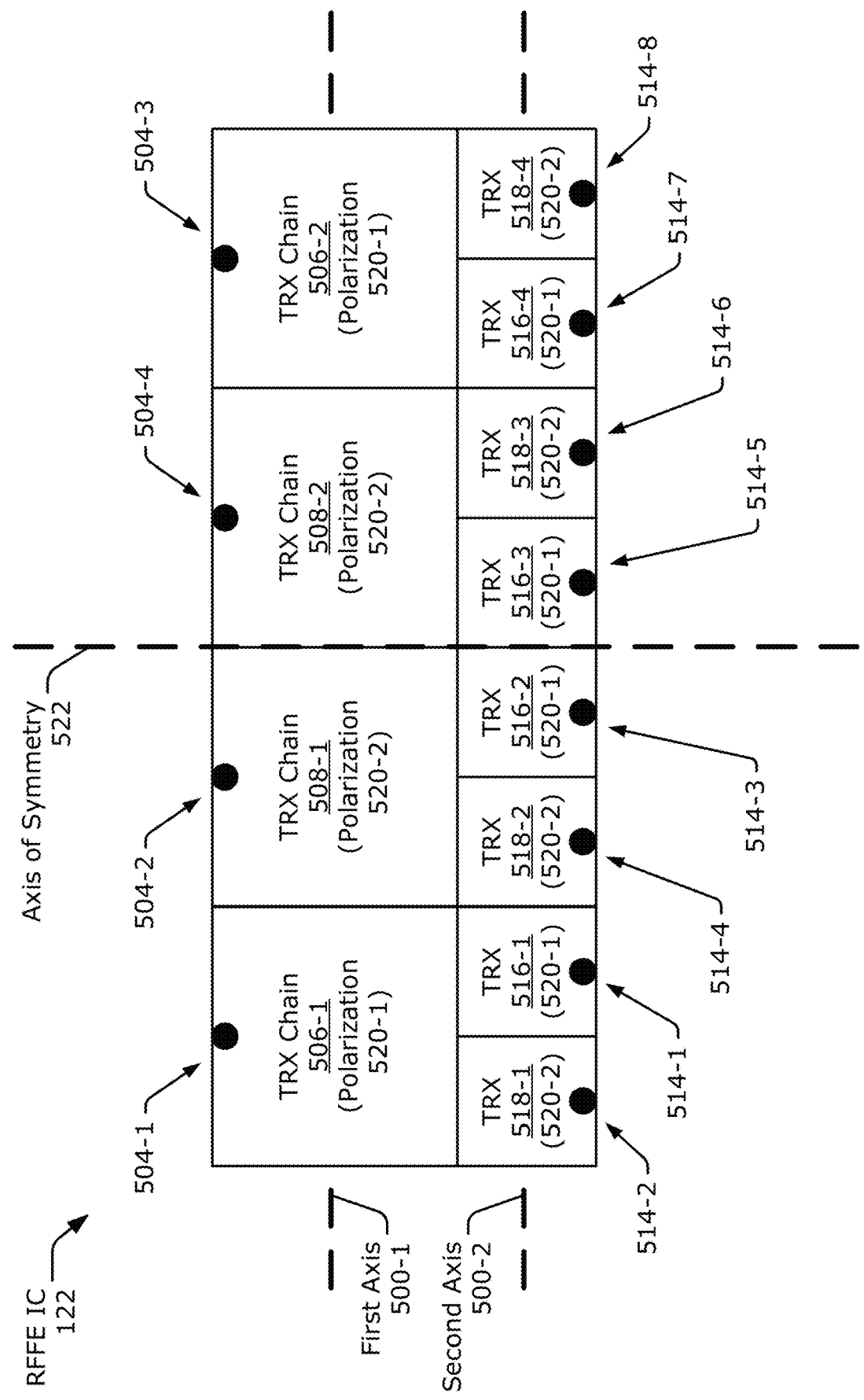
Figures 3, 5:
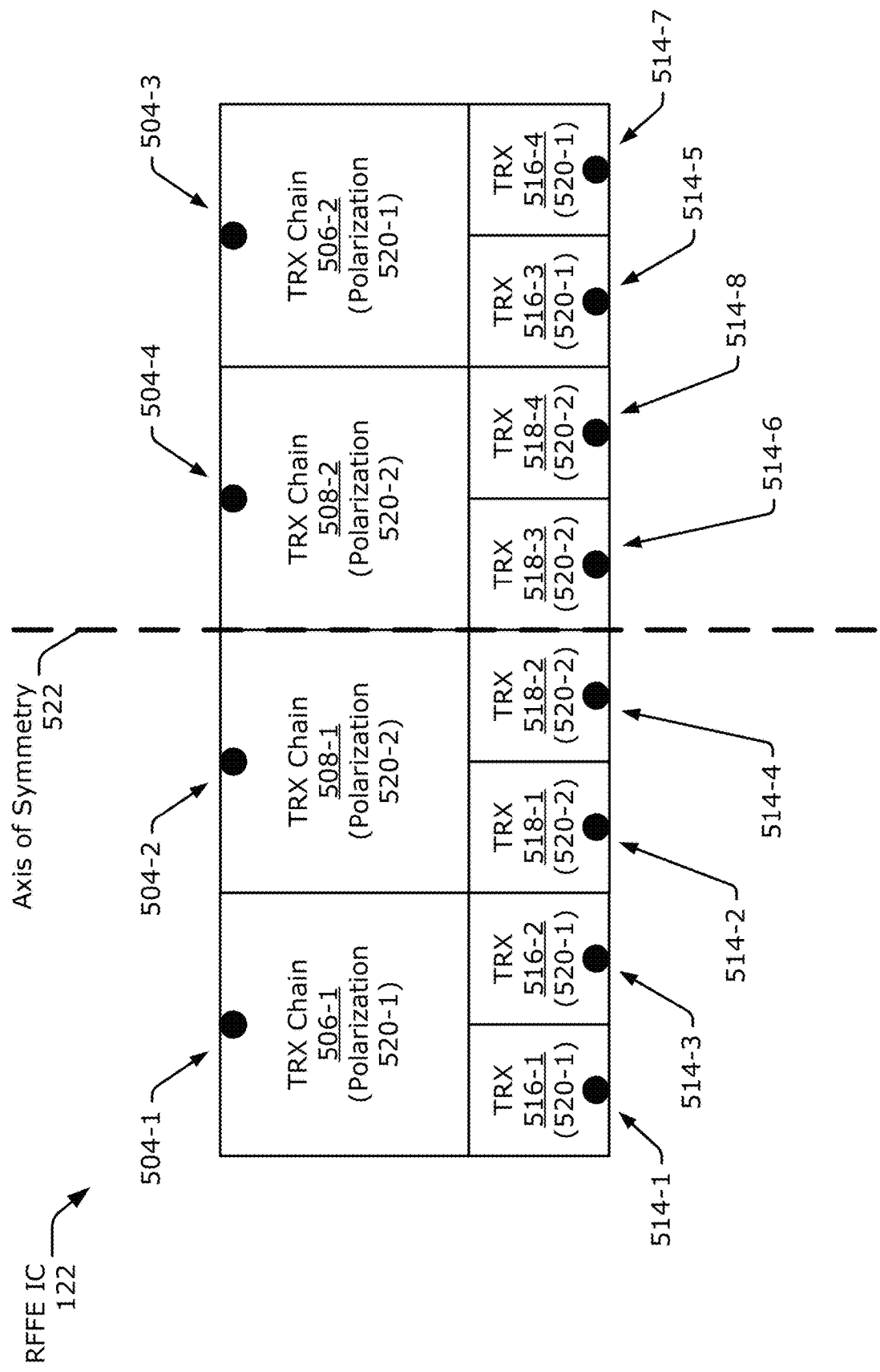
Figures 4, 5:
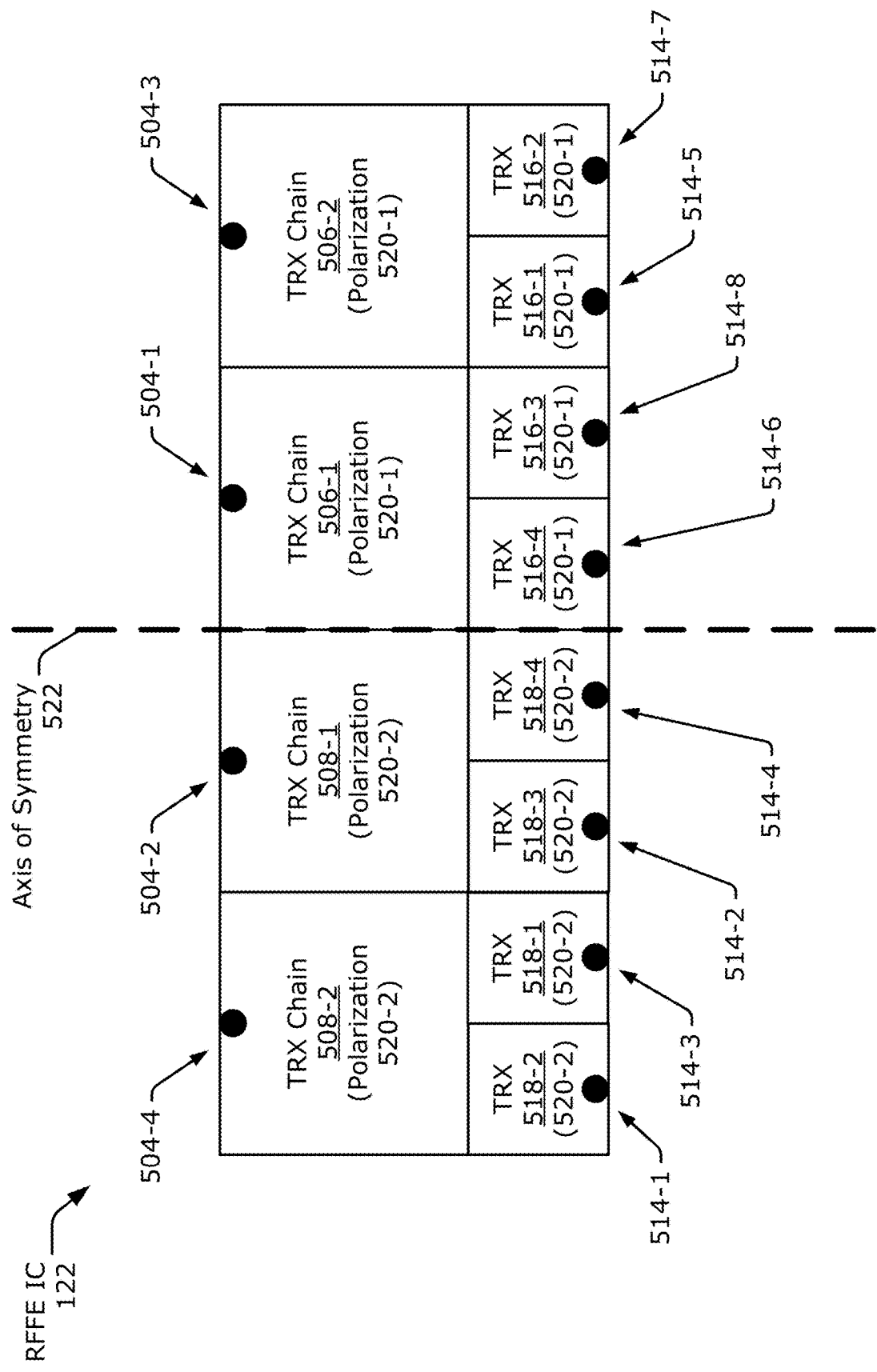
Figure 5:
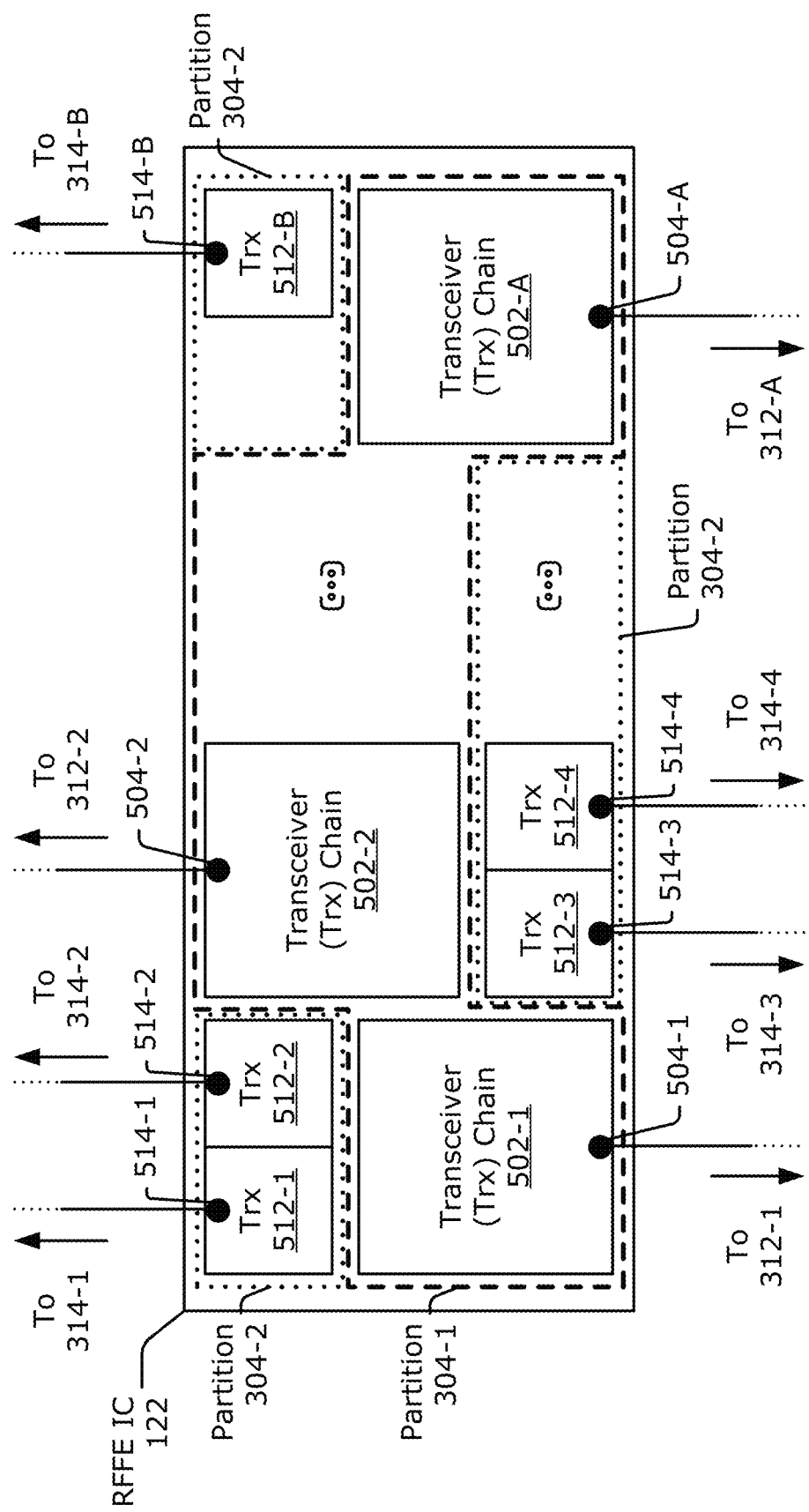

FIG. 5-1 illustrates an example non-interleaved partitioning of the radio-frequency front-end integrated circuit 122 for implementing the multi-band mmW antenna array and RFIC module 120. In the depicted configuration, the partitions 304-1 and 304-2 of the radio-frequency front-end integrated circuit 122 are contiguous about a first axis 500-1 and a second axis 500-2, respectively. The partition 304-1 includes transceiver (Trx) chains 502-1 to 502-A, which are arranged in a row along the first axis 500-1 in a continuous fashion. The transceiver chains 502-1 to 502-A have respective ports 504-1 to 504-A that are coupled to the terminals 312-1 to 312-A of FIG. 3. Through the ports 504-1 to 504-A, the transceiver chains 502-1 to 502-A are coupled to the feed ports 412 or 416 of the antenna elements 402-1 to 402-C within the antenna array 124-1. Likewise, the partition 304-2 includes transceiver chains 512-1 to 512-B, which are arranged in a row along the second axis 500-2 in a continuous fashion. The transceiver chains 512-1 to 512-B have respective ports 514-1 to 514-B that are coupled to the terminals 314-1 to 314-B of FIG. 3. Through the ports 514-1 to 514-B, the transceiver chains 512-1 to 512-B are coupled to the feed ports 412 or 416 of the antenna elements 404-1 to 404-D within the antenna array 124-2.

In general, the transceiver chains 502-1 to 502-A have a larger size than the transceiver chains 512-1 to 512-B because the transceiver chains 502-1 to 502-A utilize larger components to support the mmW frequency band 210-1, which has larger wavelengths than those of the mmW frequency band 210-2 supported by the transceiver chains 512-1 to 512-B. In this manner, a quantity of transceiver chains 512-1 to 512-B within the partition 304-2 can be larger than a quantity of transceiver chains 502-1 to 502-A within the partition 304-1 to support the larger quantity of antenna elements 404-1 to 404-D. In some cases, the partition 304-2 has twice a quantity of transceiver chains than the partition 304-1.

Although the radio-frequency front end integrated circuit 122 is shown to have two partitions 304-1 and 304-2, other implementations may have more than two partitions. Additionally or alternatively, other implementations may have more than two rows of transceiver chains. The additional rows can be associated with another partition or associated with the partitions 304-1 or 304-2 (e.g., such that the transceiver chains 502-1 to 502-A or 512-1 to 512-B are arranged along multiple axes).

Each transceiver chain 502-1 to 502-A and 512-1 to 512-B can include, for example, a power amplifier, a low-noise amplifier, a separate receiver phase shifter and transmitter phase shifter, or a common phase shifter shared between a receiver and a transmitter, one or more switches, and so forth. Within the radio-frequency front-end integrated circuit 122, the multiple transceiver chains 502-1 to 502-A and 512-1 to 512-B are coupled to mixers. Because the transceiver chains 502-1 to 502-A and 512-1 to 512-B are coupled to the feed ports 412 or 416 of the antenna elements 402-1 to 402-C and 404-1 to 404-D, each transceiver chain is associated with a particular polarization of the feed ports 412 or 416, as further described with respect to FIGS. 5-2 and 5-3. The radio-frequency front-end integrated circuit 122 can couple the transceiver chains 502-1 to 502-A and 512-1 to 512-B associated with a same polarization together, as further described with respect to FIG. 5-8.

In some implementations, positions of the transceiver chains 502-1 to 502-A within the partition 304-1 or the transceiver chains 512-1 to 512-B within the partition 304-2 can be approximately symmetrical about an axis that is perpendicular to the first axis 500-1 or the second axis 500-2. The ports 504-1 to 504-A or 514-1 to 514-B may also be symmetrically arranged about the axis, as further depicted in FIGS. 5-2 to 5-4.

FIG. 5-2 illustrates an example arrangement of the multiple transceiver chains associated with different polarizations within the radio-frequency front-end integrated circuit 122 of FIG. 5-1 for implementing the multi-band mmW antenna array and RFIC module 120. In the depicted configuration, the radio-frequency front-end integrated circuit 122 includes four transceiver chains that support the mmW frequency band 210-1 and eight transceiver chains that support the mmW frequency band 210-2. The transceiver chains are represented with different identification numbers relative to FIG. 5-1 to further identify the polarization or type of feed port each transceiver chain is connected to. The number after the dash identifies a particular dual-polarized antenna element 422 or a pair of single-polarized antenna elements (e.g., a horizontally-polarized antenna element 410 and a vertically-polarized antenna element 414) that the transceiver chain is connected to.

For example, the transceiver chains 502-1 to 502-A of FIG. 5-1 are shown to include transceiver chains 506-1 to 506-2 and transceiver chains 508-1 to 508-2. The ports 504-1 and 504-3 of the transceiver chains 506-1 and 506-2 are coupled to horizontally-polarized feed ports 412 or vertically-polarized feed ports 416 according to a first polarization 520-1. The ports 504-2 and 504-4 of the transceiver chains 508-1 and 508-2 are coupled to feed ports of the antenna array 124-1 associated with a second polarization 520-2. The second polarization 520-2 differs from the first polarization 520-1 such that if the first polarization 520-1 represents a horizontal polarization, the second polarization 520-2 represents a vertical polarization (or vice versa). The transceiver chains 506-1 and 508-1 are coupled to the antenna element 402-1, which may comprise a particular dual-polarized antenna element 422 or a pair of single-polarized antenna elements within the antenna array 124-1. Similarly, the transceiver chains 506-2 and 508-2 are coupled to the antenna element 402-2, which may also comprise a dual-polarized antenna element 422 or another pair of single-polarized antenna elements within the antenna array 124-1.

The transceiver chains 512-1 to 512-B of FIG. 5-1 are shown in FIG. 5-2 to include transceiver chains 516-1 to 516-4, which are associated with the first polarization 520-1, and transceiver chains 518-1 to 518-4, which are associated with the second polarization 520-2. The transceiver chains 516-1 and 518-1 are respectively coupled to the antenna element 404-1, which can comprise a dual-polarized antenna element 422 or a pair of single-polarized antenna elements within the antenna array 124-2. The transceiver chains 516-2 and 518-2, 516-3 and 518-3, and 516-4 and 518-4 are similarly coupled to antenna elements 404-2, 404-3, and 404-4 within the antenna array 124-2.

Figures 5, 6:
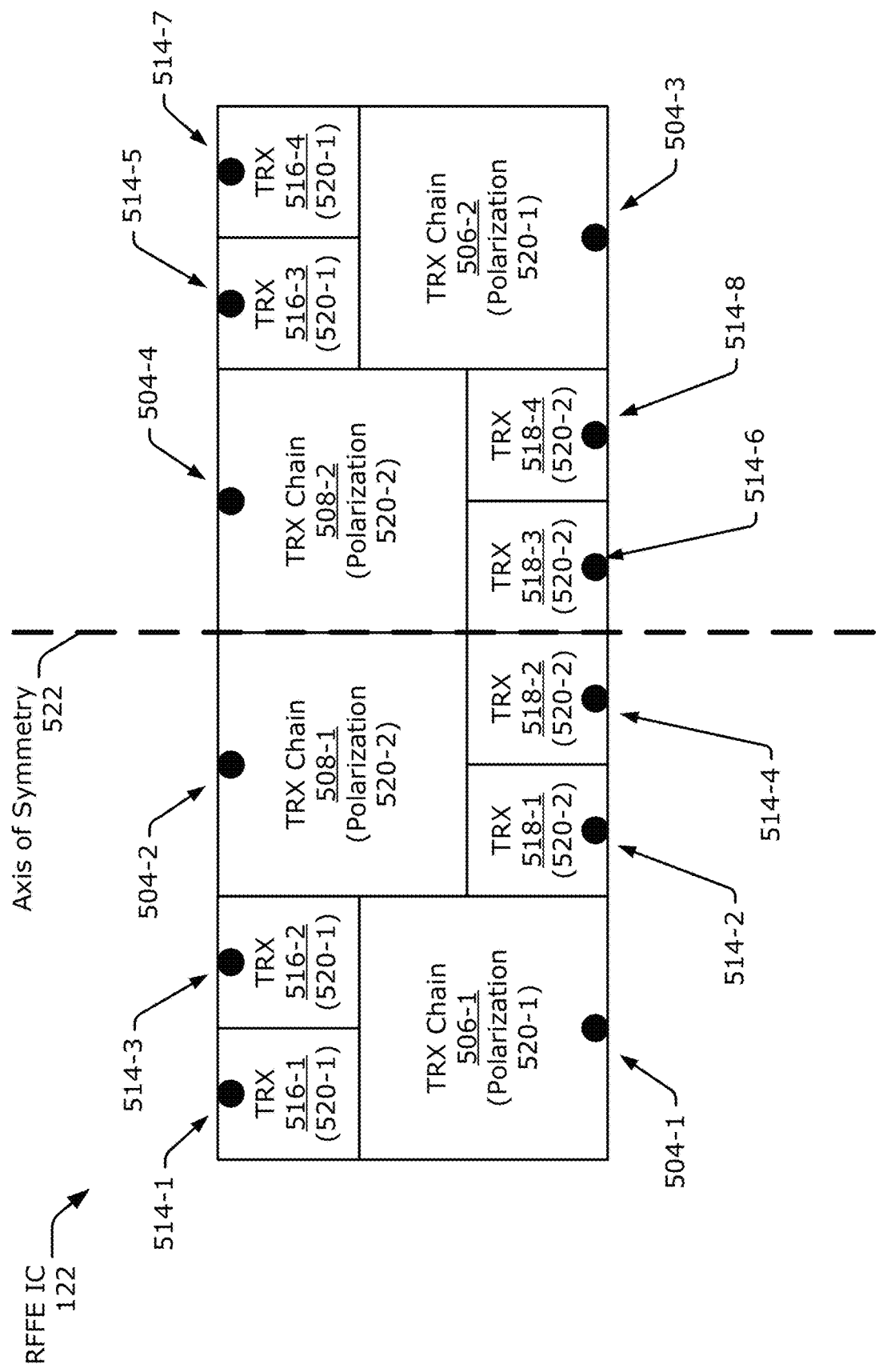
Figures 5, 6, 7:
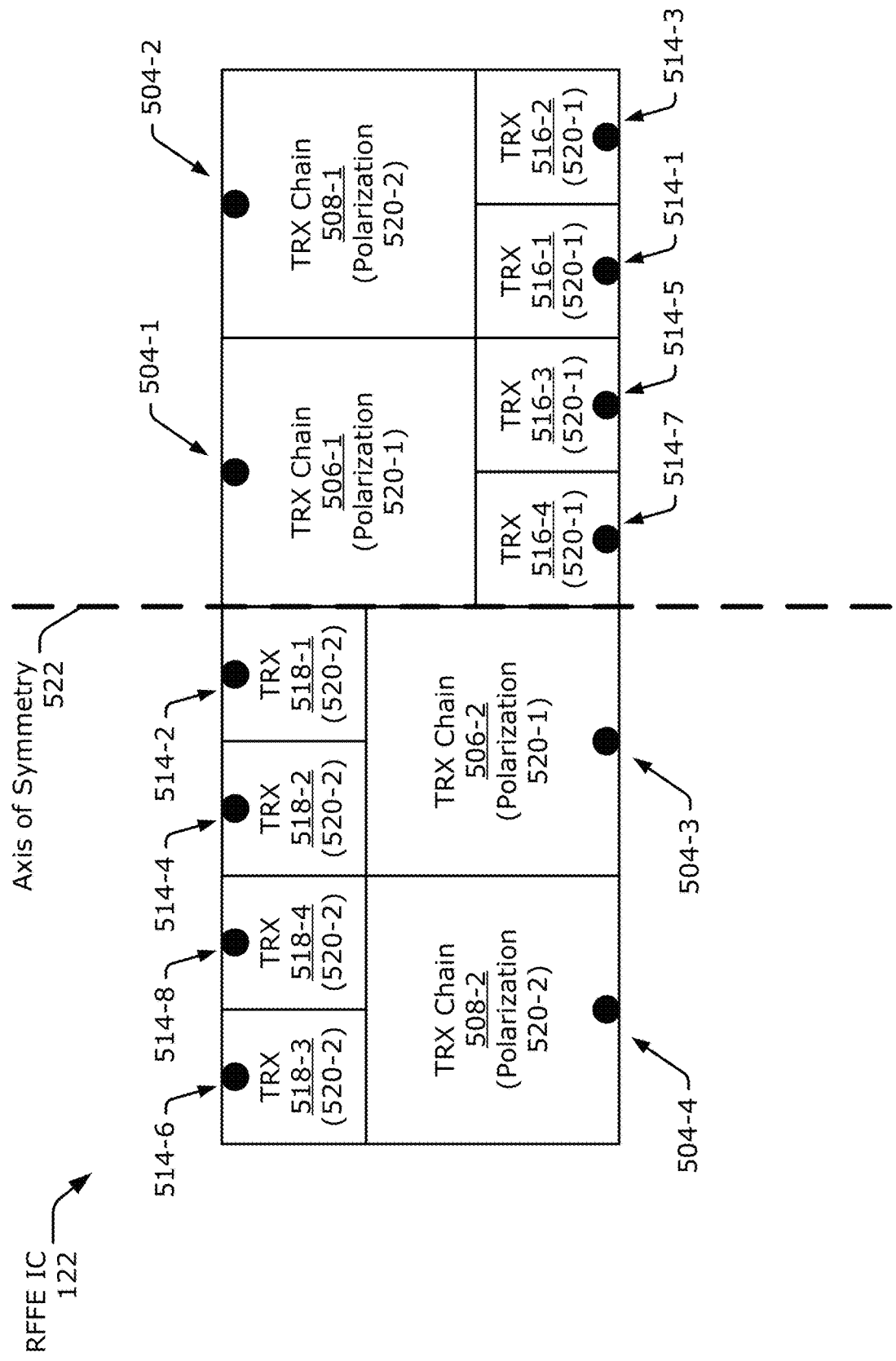
Figures 5, 6, 7, 8:
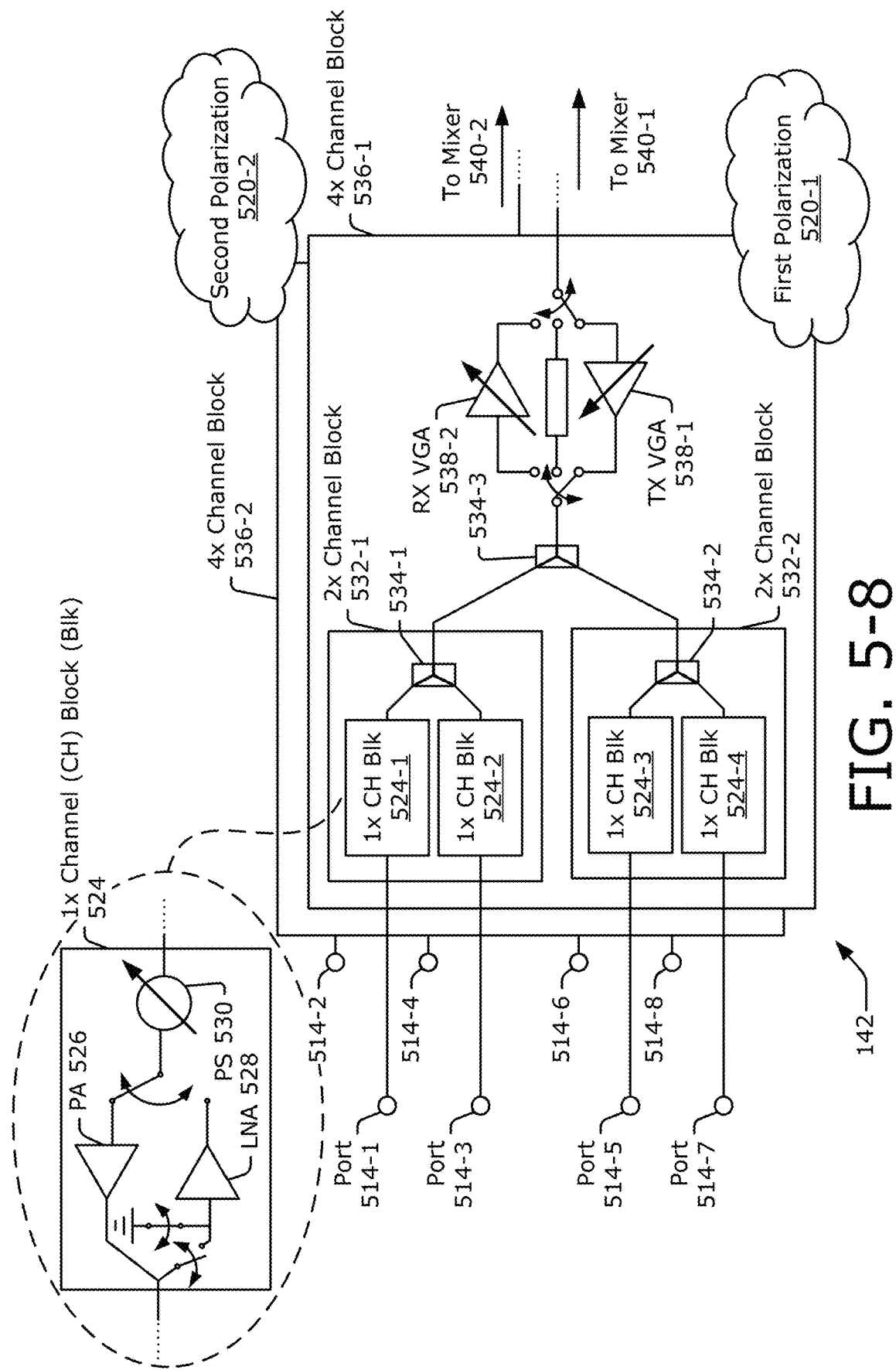
Figures 1, 6:
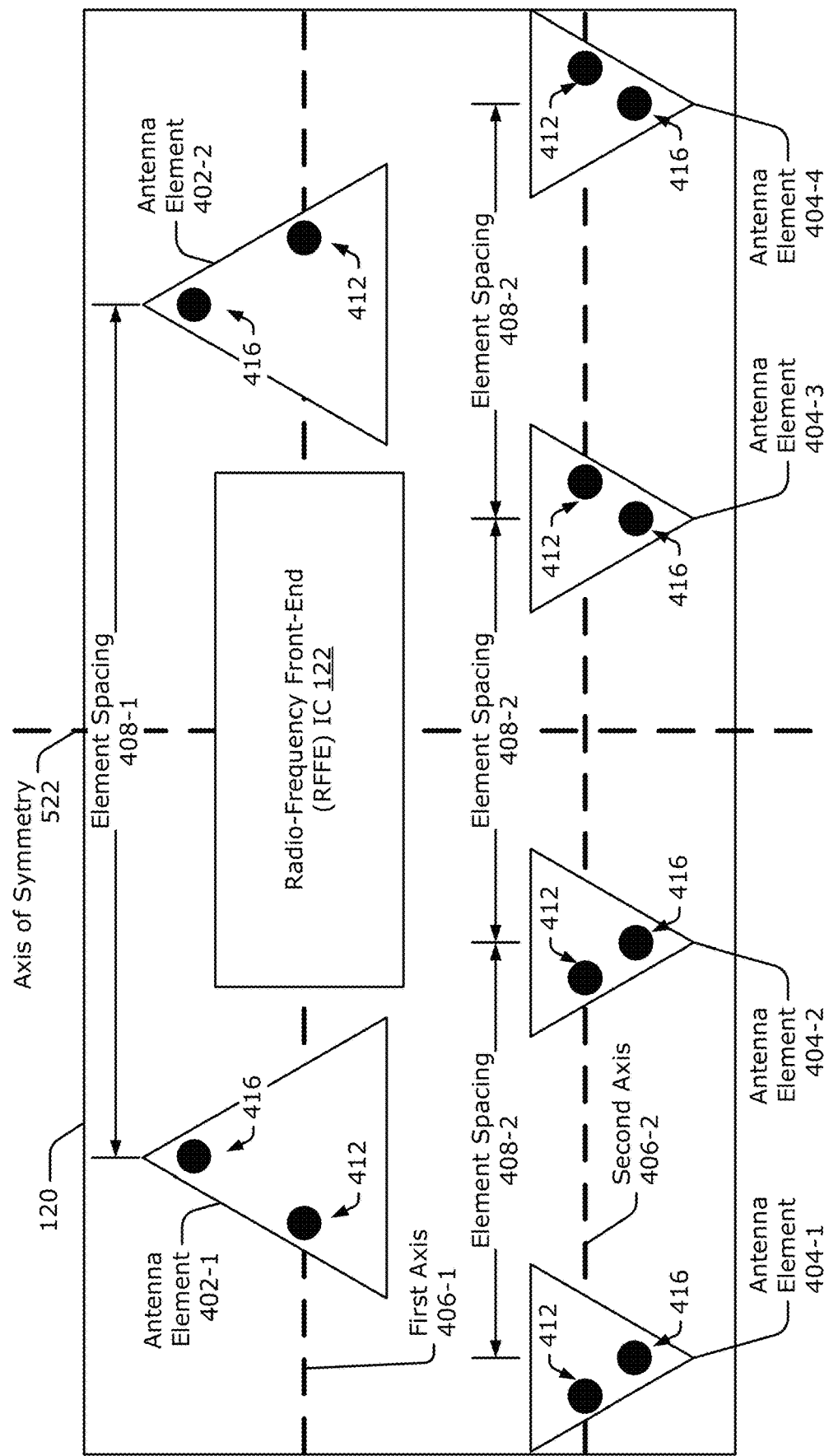
Figures 2, 6:
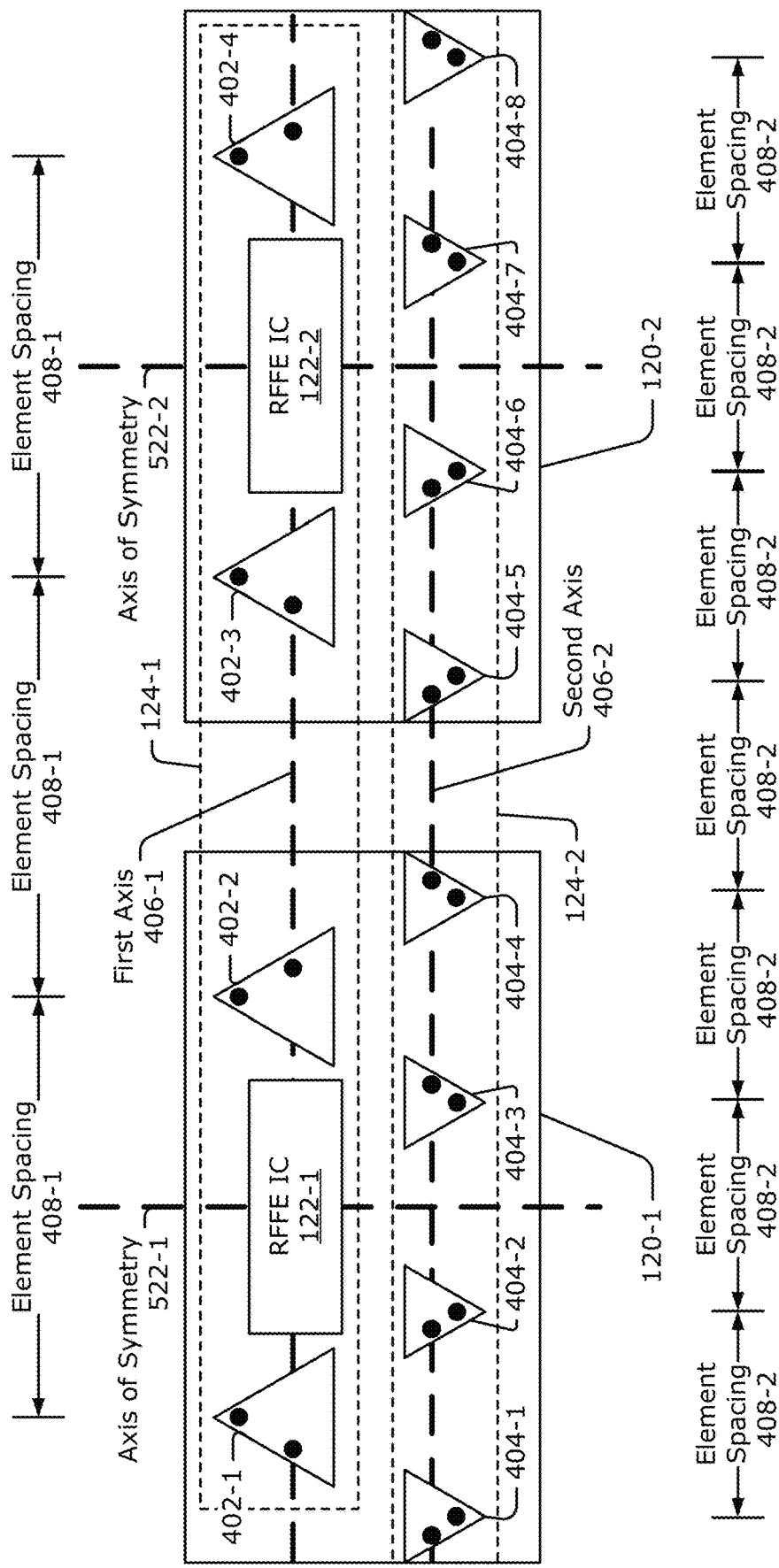
Figures 3, 6:
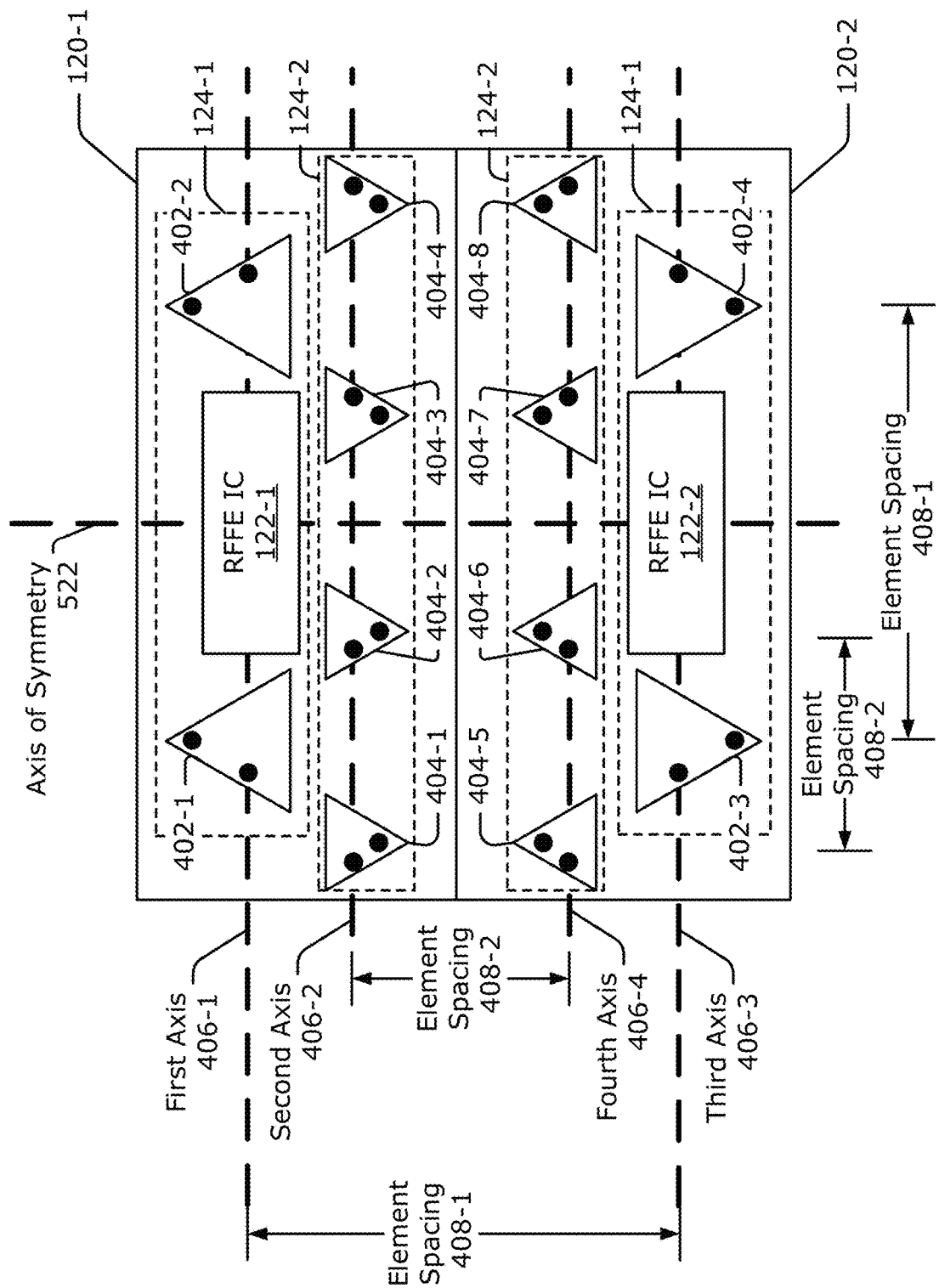
Figures 1, 7:
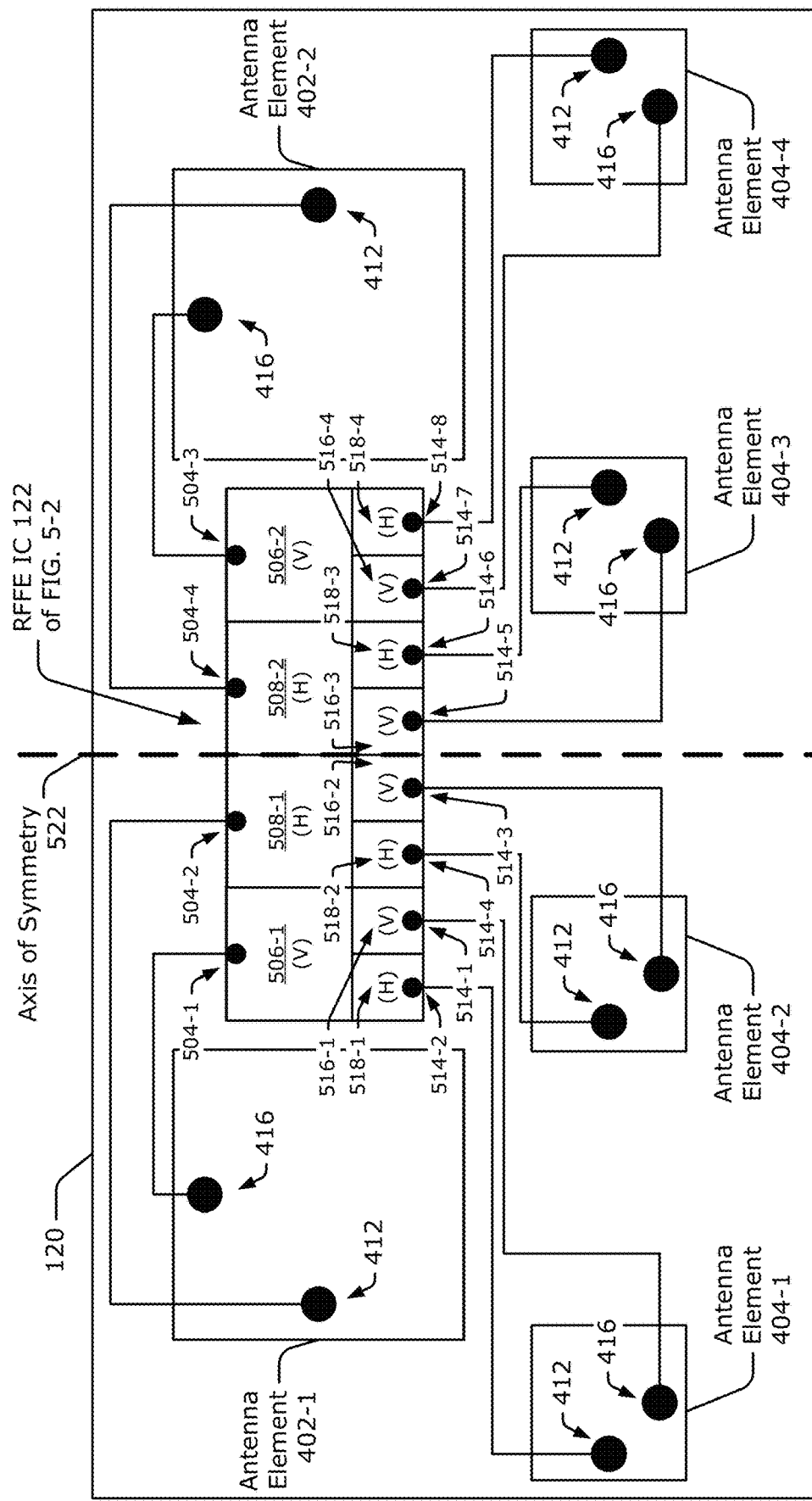
Figures 2, 7:
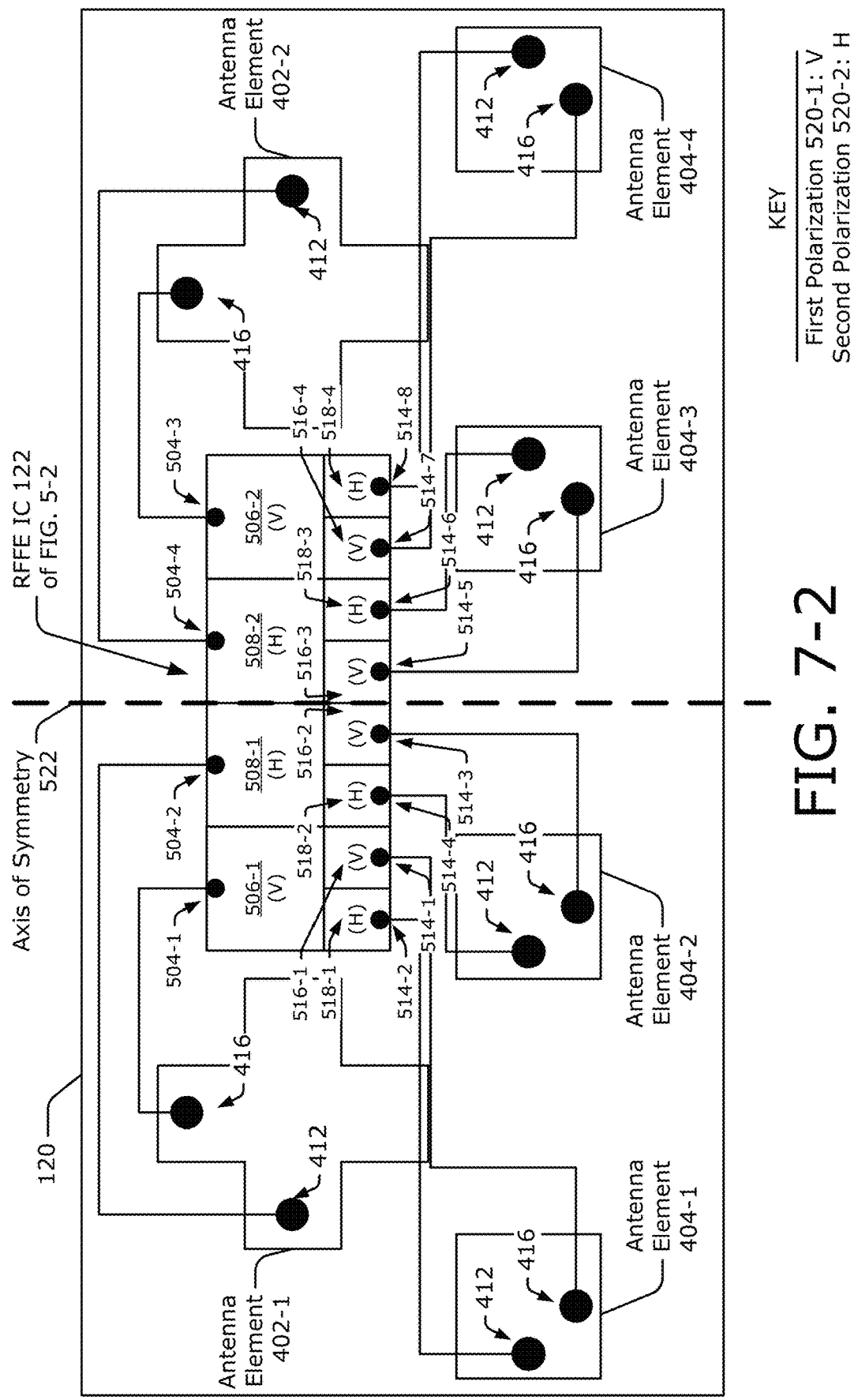
Figures 3, 7:
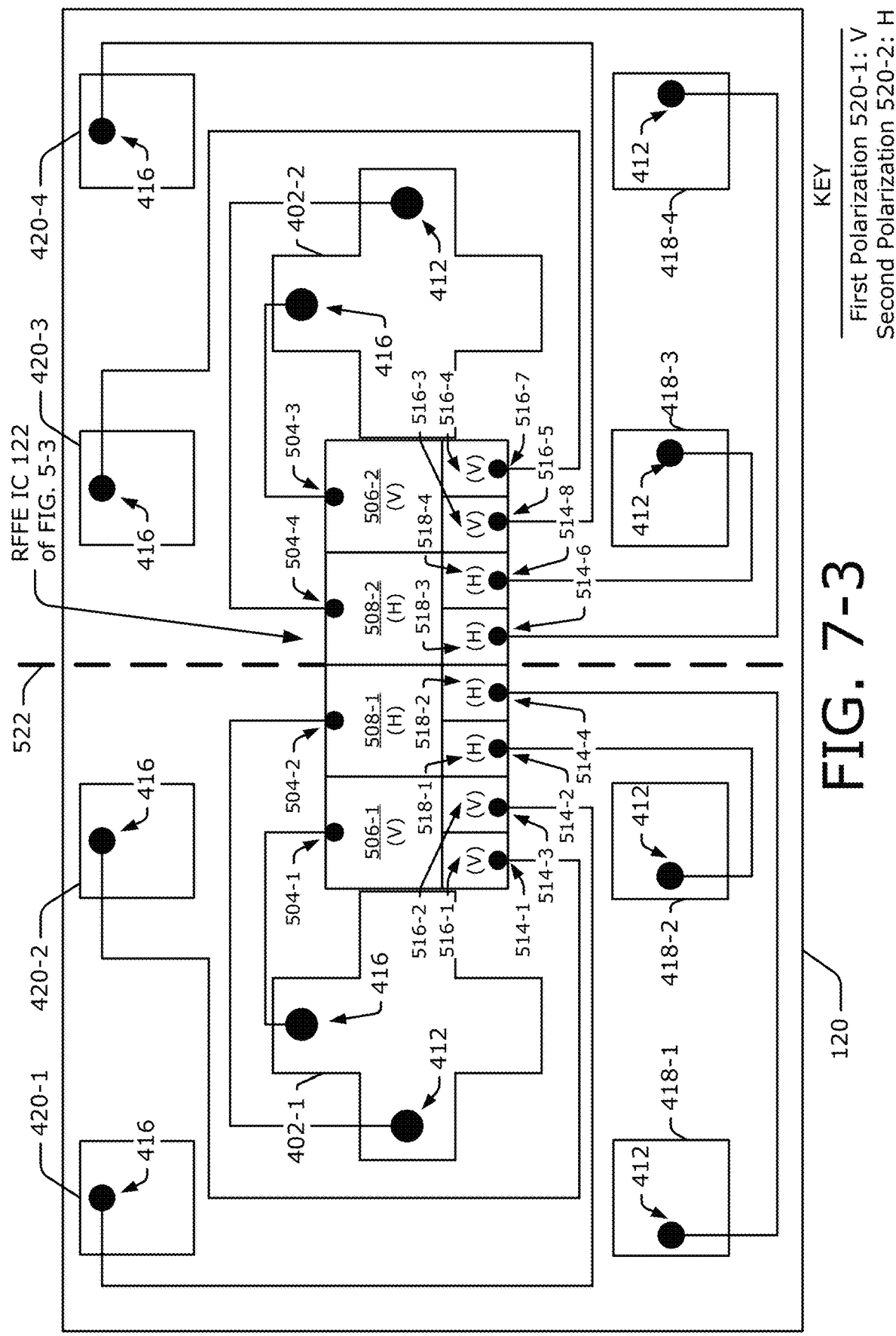
Figures 4, 7:
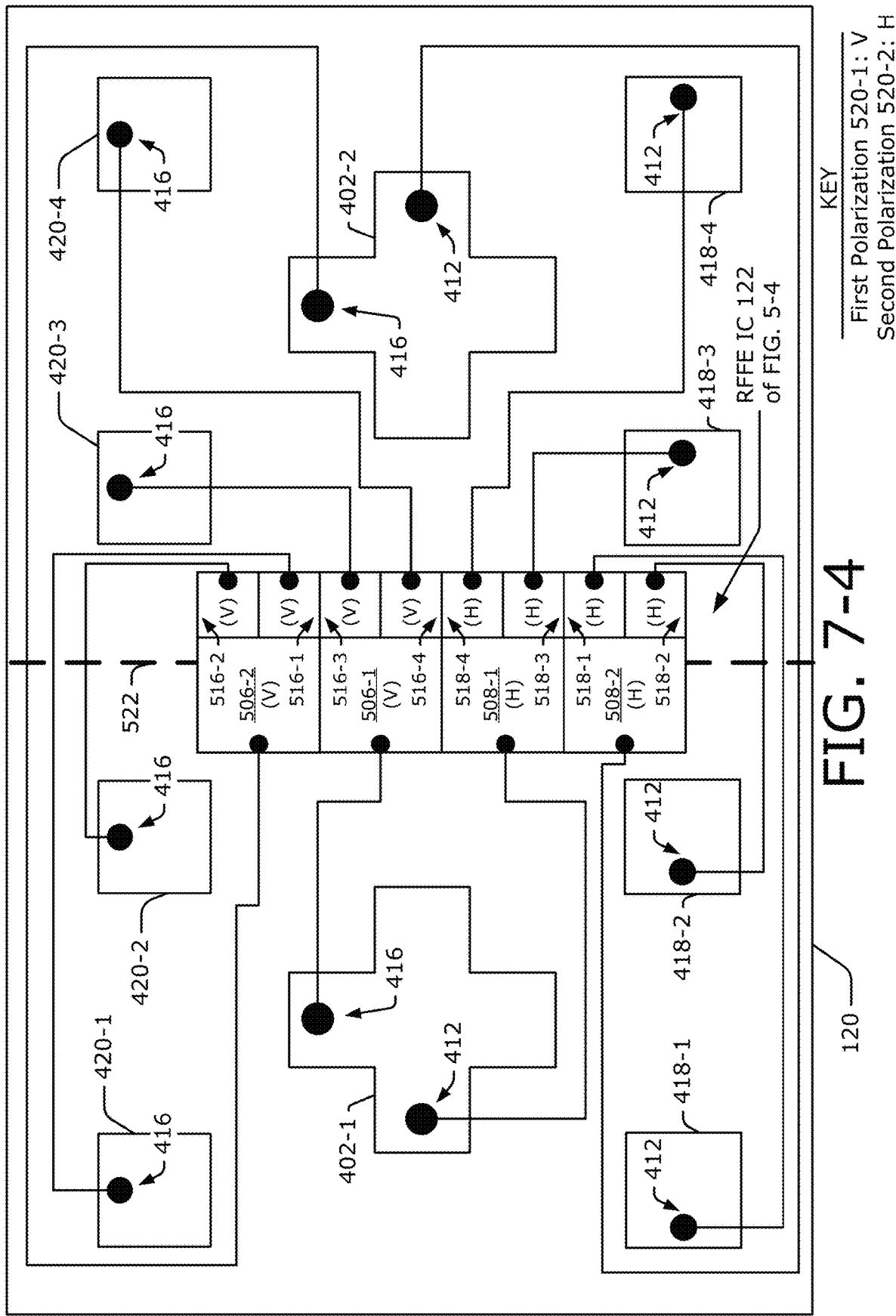
Figures 5, 7:
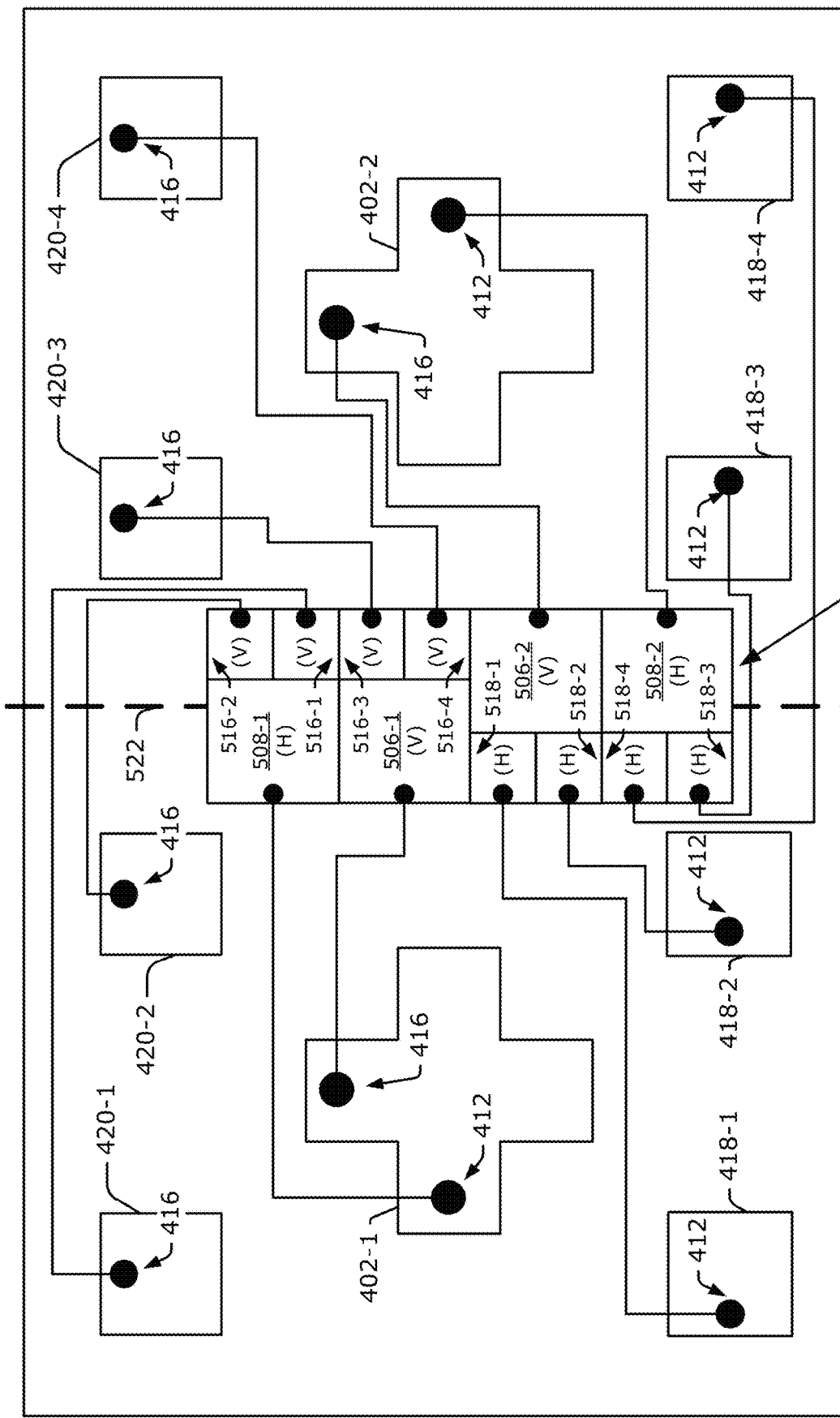
Figures 1, 8:
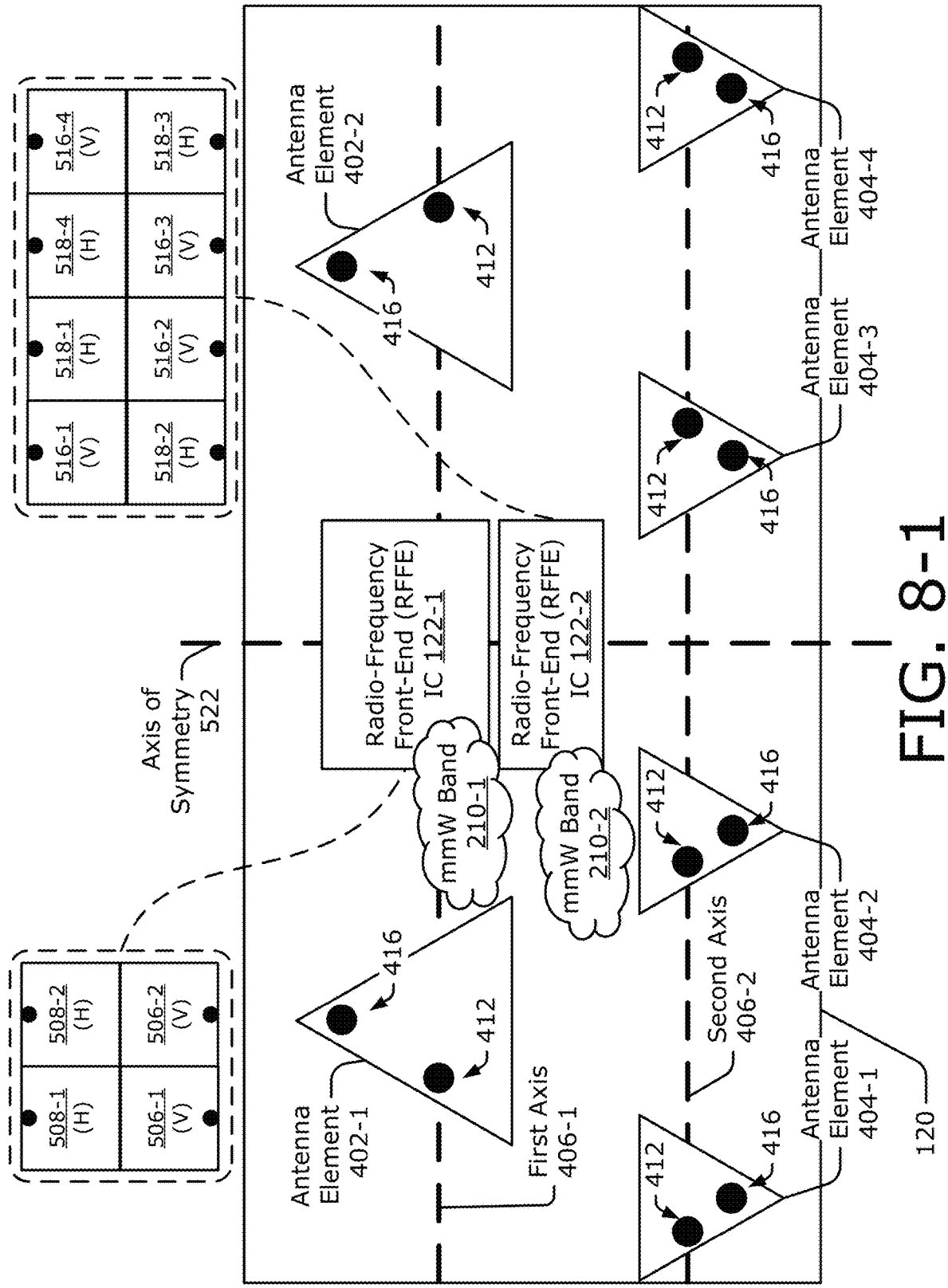
Figures 2, 8:
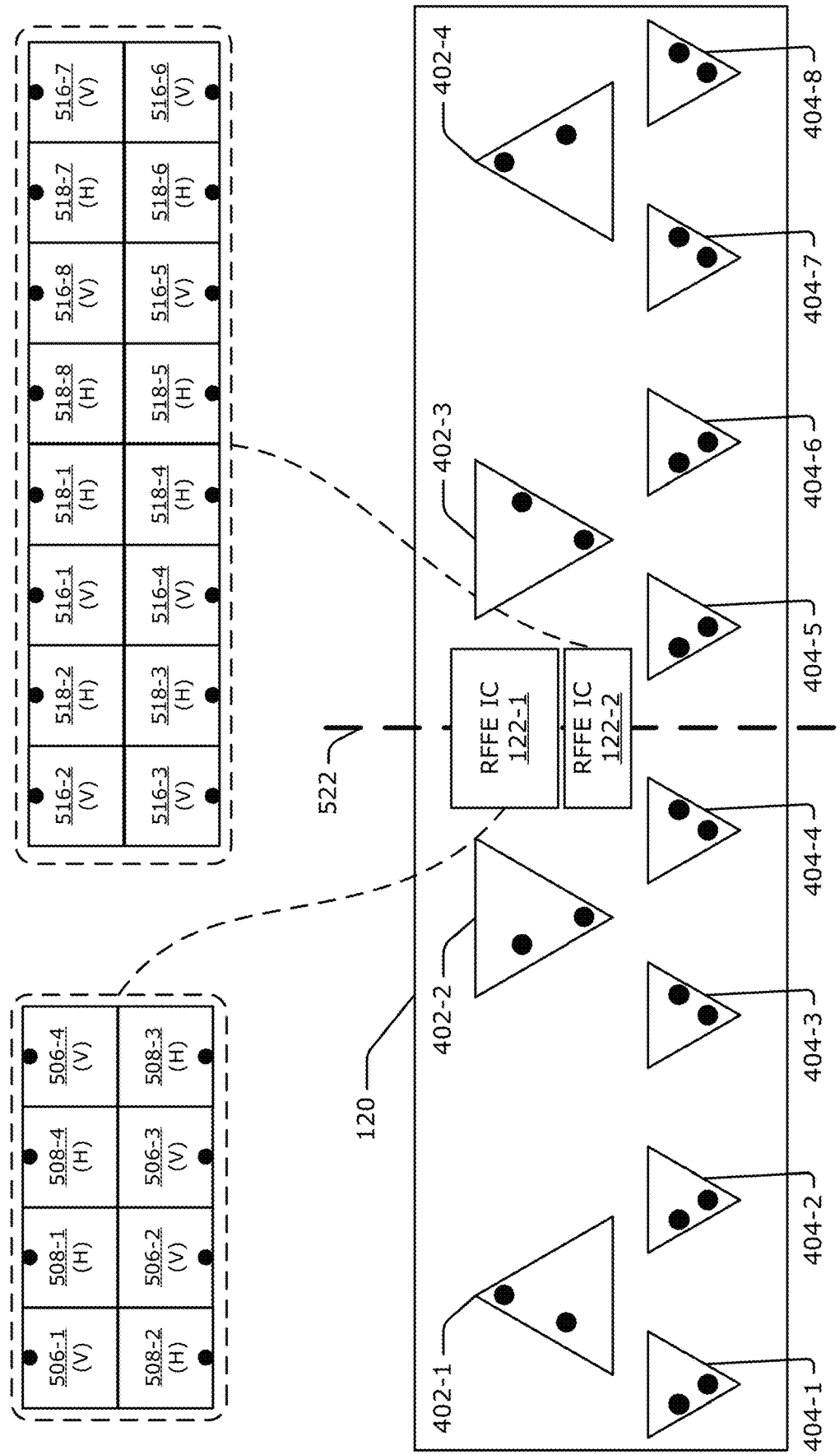

As shown in FIG. 5-2, an order of the types of polarizations 520-1 and 520-2 that the four transceiver chains 506-1 to 508-2 are associated with is symmetrical about an axis of symmetry 522. The axis of symmetry 522 is approximately perpendicular to the first axis 500-1 or the second axis 500-2 and can run vertically down a center of the antenna arrays 124-1 and 124-2, as shown in FIG. 6-1. Similarly, an order of the types of polarizations 520-1 and 520-2 associated with the eight transceiver chains 516-1 to 518-4 along the second axis 500-2 is symmetrical about the axis of symmetry 522. This arrangement enables multiple traces within the multi-band mmW antenna array and RFIC module 120 to be disposed in a same metal layer, as further described with respect to FIGS. 7-1 and 7-2. In this case, both sets of transceiver chains 506-1 to 508-2 and 516-1 to 518-4 alternate polarizations on either side of the axis of symmetry 522. Additionally, the pair of transceiver chains associated with a particular antenna element of the antenna elements 402-1 to 402-C or 404-1 to 404-D are adjacent to one another (e.g., the transceiver chain 506-1 is adjacent to the transceiver chain 508-1 and the transceiver chain 516-1 is adjacent to the transceiver chain 518-1). Other symmetrical arrangements are also possible, such as an alternative arrangement of the eight transceiver chains 516-1 to 518-4 shown in FIG. 5-3.

FIG. 5-3 illustrates another example arrangement of the multiple transceiver chains associated with different polarizations within the radio-frequency front-end integrated circuit 122 of FIG. 5-1 for implementing the multi-band mmW antenna array and RFIC module 120. In the depicted configuration, the order of the four transceiver chains 506-1 to 508-2 is similar to FIG. 5-2. However, the eight transceiver chains 516-1 to 518-4 are arranged in a different symmetrical order as compared to FIG. 5-2. In FIG. 5-2, polarizations of the transceiver chains are alternated, and pairs of transceiver chains associated with different antenna elements are positioned adjacent to one another. In contrast for FIG. 5-3, transceiver chains (of the eight transceiver chains 516-1 to 518-4) that are associated with different antenna elements are alternated, and the transceiver chains associated with a particular polarization are paired together and positioned adjacent to one another. For example, the transceiver chains 516-1 and 518-1 are interleaved with the transceiver chains 516-2 and 518-2 on a left side of the axis of symmetry 522. As a result, the transceiver chains 516-1 and 516-2, which are both associated with the first polarization 520-1, are adjacent to one another, and the transceiver chains 518-1 and 518-2, which are both associated with the second polarization 520-2, are also adjacent to one another. Likewise, the transceiver chains 516-3 and 518-3 are alternated with the transceiver chains 516-4 and 518-4 such that the transceiver chains 518-3 and 518-4 are adjacent to one another and the transceiver chains 516-3 and 516-4 are adjacent to one another. With the arrangement described above, the order of the types of polarizations 520-1 or 520-2 that the eight transceiver chains 516-1 to 518-4 are associated with is symmetrical about the axis of symmetry 522.

FIG. 5-4 illustrates an additional example arrangement of multiple transceiver chains associated with different polarizations within the radio-frequency front-end integrated circuit of FIG. 5-1 for implementing the multi-band mmW antenna array and RFIC module 120. In FIGS. 5-2 and 5-3, the order of the polarizations 520-1 and 520-2 are symmetrical about the axis of symmetry 522. In contrast for FIG. 5-4, the order of the polarizations 520-1 and 520-2 is not symmetrical. In particular, the polarizations of the transceiver chains on a right side of the axis of symmetry 522 correspond to the polarization 520-1 and the polarizations of the transceiver chains on a left side of the axis of symmetry 522 correspond to the polarization 520-2. This depicted configuration can facilitate routings within the multi-band mmW antenna array and RFIC module 120 in implementations in which one of the antenna arrays 124-1 or 124-2 includes pairs of single-polarized antennas located on opposite sides of the radio-frequency front-end integrated circuit 122, an example of which is shown in FIG. 7-4. While the partitions 304-1 and 304-2 are shown to be contiguous in FIGS. 5-1 to 5-4, other implementations of the radio-frequency front-end integrated circuit 122 can have one or more partitions that are non-contiguous, as shown in FIGS. 5-5 to 5-7.

FIG. 5-5 illustrates an example interleaved partitioning of the radio-frequency front-end integrated circuit 122 for implementing the multi-band mmW antenna array and RFIC module 120. In contrast to FIG. 5-1, the partition 304-2 is shown to be non-contiguous with different portions alternately distributed above and below the partition 304-1. In this manner, the transceiver chains 502-1 to 502-A and the transceiver chains 512-1 to 512-B are arranged along multiple axes and have ports 504-1 to 504-A and 514-1 to 514-B that are located across both sides of the radio-frequency front-end integrated circuit 122. This can facilitate routings within the multi-band mmW antenna array and RFIC module 120 in implementations in which one of the antenna arrays 124-1 or 124-2 includes pairs of single-polarized antennas located on opposite sides of the radio-frequency front-end integrated circuit 122, an example of which is shown in FIG. 7-3. An example order of the types of polarizations 520-1 and 520-2 that the transceiver chains 502-1 to 502-A and 512-1 to 512-B are associated with is further described with respect to FIGS. 5-6 and 5-7 using a similar notation as FIGS. 5-2 to 5-4.

FIG. 5-6 illustrates an example arrangement of the multiple transceiver chains associated with different polarizations within the radio-frequency front-end integrated circuit 122 of FIG. 5-5 for implementing the multi-band mmW antenna array and RFIC module 120. In the depicted configuration, the order of the four transceiver chains 506-1 to 508-2 from left to right (or right to left) is similar to the order shown in FIGS. 5-2 and 5-3. As such, the order of the types of polarizations 520-1 and 520-2 associated with the four transceiver chains 506-1 to 508-2 is symmetrical about the axis of symmetry 522. Likewise, the order of the eight transceiver chains 516-1 to 518-4 from left to right (or right to left) is similar to the order shown in FIG. 5-3. The order of the types of polarizations 520-1 and 520-2 associated with the eight transceiver chains 516-1 to 518-4 is also symmetrical about the axis of symmetry 522. The arrangement of the transceiver chains 506-1 to 508-2 and 516-1 to 518-4 in FIGS. 5-5 and 5-6 are shown to be symmetrical about the axis of symmetry 522. Other non-symmetrical arrangements of transceiver chains or polarization orders are also possible, as further described with respect to FIG. 5-7.

FIG. 5-7 illustrates another example arrangement of the multiple transceiver chains associated with different polarizations within the radio-frequency front-end integrated circuit 122 of FIG. 5-5 for implementing the multi-band mmW antenna array and RFIC module 120. In the depicted configuration, the transceiver chains 506-1 and 508-1 are positioned together along a top side of the radio-frequency front-end integrated circuit 122, and the transceiver chains 506-2 and 508-2 are positioned together along a bottom side of the radio-frequency front-end integrated circuit 122. The four transceiver chains 516-1 to 516-4 are positioned together along the bottom side of the radio-frequency front-end integrated circuit 122 below the transceiver chains 506-1 and 508-1. The four transceiver chains 518-1 to 518-4 are positioned together along the top side of the radio-frequency front-end integrated circuit 122 above the transceiver chains 506-2 and 508-2. In this manner, the arrangement of the four transceiver chains 506-1 to 508-2 and the eight transceiver chains 516-1 to 518-4 is not symmetrical about the axis of symmetry 522.

In this case, the order of the polarizations 520-1 and 520-2 associated with the four transceiver chains 506-1 to 508-2 is symmetrical about the axis of symmetry 522. In contrast, the order of the polarizations 520-1 and 520-2 associated with the eight transceiver chains 516-1 to 518-4 is not symmetrical. In particular, the polarizations associated with the four transceiver chains 516-1 to 516-4 on a right side of the axis of symmetry 522 correspond to the polarization 520-1. The polarizations associated with the four transceiver chains 518-1 to 518-4 on a left side of the axis of symmetry 522 correspond to the polarization 520-2. This depicted configuration can enable traces within the multi-band mmW antenna array and RFIC module 120 to be disposed in a same metal layer, as shown in FIG. 7-5. The transceiver chains associated with the same polarization 520-1 or 520-2 can be combined within the radio-frequency front-end integrated circuit 122, as further described with respect to FIG. 5-8.

FIG. 5-8 illustrates example implementations of transceiver chains within the radio-frequency front-end integrated circuit 122 for implementing the multi-band mmW antenna array and RFIC module 120. In the depicted configuration, the eight transceiver chains 516-1 to 518-4 associated with the partition 304-2 each include a single-channel block 524 (1×CH Blk 524). The single-channel block 524 is shown to include a power amplifier 526 (PA 526), a low-noise amplifier 528 (LNA 528), and a phase shifter 530 (PS 530). The four transceiver chains 516-1 to 516-4, which are associated with the first polarization 520-1, respectively include the single-channel blocks 524-1 to 524-4.

Generally, the radio-frequency front-end integrated circuit 122 couples pairs of the single-channel blocks 524-1 to 524-4 associated with the first polarization 520-1 together within a two-channel block 532 using a coupler 534. For example, a two-channel block 532-1 couples the single-channel blocks 524-1 and 524-2 together using the coupler 534-1, and a two-channel block 532-2 couples the single-channel blocks 524-3 and 524-4 together using the coupler 534-2. In general, the couplers 534-1 and 534-2 split or combine signals that propagate within the two-channel blocks 532-1 and 532-2. As an example, the couplers 534-1 and 534-2 may be implemented using Wilkinson splitters and combiners. These two-channel blocks 532-1 and 532-2 are also coupled together within a four-channel block 536-1.

The four-channel block 536-1 includes a coupler 534-3, which couples the two channel blocks 532-1 and 532-2 together; a transmit (TX) variable gain amplifier (VGA)

538-1; and a receive (RX) variable gain amplifier 538-2. Although not explicitly shown, the four-channel block 536-1 may also include a mixer 540-1, which is coupled to the transmit variable gain amplifier 538-1 and the receive variable gain amplifier 538-2. In some implementations, the routing and couplers 534-1 to 534-3 within the four-channel block 536-1 are disposed or travel along a middle of the radio-frequency front-end integrated circuit 122, such as between the axes 500-1 and 500-2 or the partitions 304-1 and 304-2 in FIG. 5-1 or 5-5.

The radio-frequency front-end integrated circuit 122 also includes another four-channel block 536-2 associated with the second polarization 520-2. The four-channel block 536-2 is similarly arranged as the four-channel block 536-1 and couples the four transceiver chains 518-1 to 518-4 to a mixer 540-2. The mixers 540-1 and 540-2 provide frequency conversion between radio frequencies within the mmW frequency band 210-2 to intermediate frequencies between approximately 2 and 20 GHz or to baseband frequencies.

While the ports 514-1 to 514-8 are positioned along one or more outer edges of the radio-frequency front-end integrated circuit 122, combined ports of the four-channel blocks 536-1 and 536-2 can be placed at or near the axis of symmetry along the one or more outer edges. These combined ports can be coupled to other components associated with the wireless transceiver, such as another integrated circuit associated with an intermediate frequency or a baseband frequency. In some cases, the common ports of the four-channel blocks 536-1 and 526-2 are located on opposite sides of the radio-frequency front-end integrated circuit 122 to mitigate potential electromagnetic coupling.

Although not explicitly shown, the four transceiver chains 506-1 to 508-2 may utilize a similar architecture as described with respect to FIG. 5-8. Depending on a quantity of transceiver chains within a partition 304-1 or 304-2, other implementations can include other types of channel blocks, such as one or more eight-channel blocks or sixteen-channel blocks, or can have fewer types of blocks, such as single-channel blocks and two-channel blocks. A location of the radio-frequency front-end integrated circuit 122 within the multi-band mmW antenna array and RFIC module 120 is further described with respect to FIG. 6-1.

FIG. 6-1 illustrates an example arrangement of the antenna arrays 124-1 and 124-2 and the radio-frequency front-end integrated circuit 122 for implementing the multi-band mmW antenna array and RFIC module 120. In the depicted configuration, the antenna array 124-1 includes two dual-polarized antenna elements 402-1 and 402-2 with respective horizontally-polarized feed ports 412 and vertically-polarized feed ports 416. The antenna array 124-2 includes four dual-polarized antenna elements 404-1 to 404-4 with respective horizontally-polarized feed ports 412 and vertically-polarized feed ports 416. In this case, the antenna arrays 124-1 and 124-2 are uniform linear arrays that utilize the element spacings 408-1 and 408-2, respectively. The antenna elements 402-1 and 402-2 are arranged along the first axis 406-1 on one side of the multi-band mmW antenna array and RFIC module 120 while the antenna elements 404-1 to 404-4 are arranged along the second axis 406-2 on an opposite side of the multi-band mmW antenna array and RFIC module 120 relative to the first axis 406-1.

As shown in FIG. 6-1, an order of the horizontally-polarized feed ports 412 and the vertically-polarized feed ports 416 of the antenna elements 402-1 and 402-2 along a direction of the first axis 406-1 is symmetrical about the axis of symmetry 522. Likewise, an order of the horizontally-polarized feed ports 412 and the vertically-polarized feed ports 416 of the antenna elements 404-1 to 404-4 along a direction of the second axis 406-2 is symmetrical about the axis of symmetry 522. For example, both of the vertically-polarized feed ports 416 of the antenna elements 402-1 and 402-2 are relatively closer to the axis of symmetry 522 while both of the horizontally-polarized feed ports 512 are relatively farther from the axis of symmetry 522. In this manner, the order of the horizontally-polarized feed ports 412 and the vertically-polarized feed ports 416 is symmetrical.

One or more pairs of antenna elements selected from the antenna elements 402-1 and 402-2 or the antenna elements 404-1 to 404-4 can have horizontally-polarized feed ports 412 or vertically-polarized feed ports 416 that are on respective sides that face away from the radio-frequency front-end integrated circuit 122 (e.g., the horizontally-polarized feed ports 412 and the vertically-polarized feed ports 416 face radially outwards from the radio-frequency front-end integrated circuit 122), as shown in FIG. 6-1. In other cases, one or more pairs of antenna elements selected from the antenna elements 402-1 and 402-2 or the antenna elements 404-1 to 404-4 can have horizontally-polarized feed ports 412 or vertically-polarized feed ports 416 that are on respective sides that face towards the radio-frequency front-end integrated circuit 122 (e.g., the horizontally-polarized feed ports 412 or the vertically-polarized feed ports 416 face radially inwards towards the radio-frequency front-end integrated circuit 122).

In some implementations, pairs of horizontally-polarized feed ports 412 or pairs of vertically-polarized feed ports 416 are positioned at approximately symmetrical distances with respect to the axis of symmetry 522. For example, a distance between the axis of symmetry 522 and the horizontally-polarized feed port 412 of the antenna element 402-1 can be approximately equal to a distance between the axis of symmetry 522 and the horizontally-polarized feed port 412 of the antenna element 402-2.

In some implementations, a center of the radio-frequency front-end integrated circuit 122 is positioned along a center vertical axis of the multi-band mmW antenna array and RFIC module 120, which is represented by the axis of symmetry 522 in FIG. 6-1. In this example, the axis of symmetry 522 is approximately perpendicular to the axes 406-1 and 406-2. In some cases, the element spacing 408-1 of the antenna array 124-1 is sufficiently large such that a size of the radio-frequency front-end integrated circuit 122 can fit within the middle elements of the antenna array 124-1 that are to the left and right of the axis of symmetry 522 (e.g., between the antenna elements 402-1 and 402-2). A portion of the radio-frequency front-end integrated circuit 122 may be positioned along the first axis 406-1 or on either side of the first axis 406-1. Also, in some aspects, the axes 500-1 and 500-2 of FIG. 5-1 are approximately parallel to the first axis 406-1.

Although the multi-band mmW antenna array and RFIC module 120 is shown to include two antenna elements 402-1 and 402-2 within the antenna array 124-1 and four antenna elements 404-1 to 404-4 within the antenna array 124-2, other implementations may have larger quantities of antenna elements. Utilizing larger quantities of antenna elements 402-1 to 402-C or 404-1 to 404-D can increase respective gains of the antenna arrays 124-1 and 124-2 and enable the antenna arrays 124-1 and 124-2 to form narrower beams. Instead of increasing the quantities of antenna elements within a single multi-band mmW antenna array and RFIC module 120, however, multiple multi-band mmW antenna array and RFIC modules 120 can be arranged together to implement larger antenna arrays 124-1 and 124-2, as further described with respect to FIGS. 6-2 and 6-3. This modular design allows simplified routing interconnections between the antenna arrays 124-1 and 124-2 and multiple RFFE IC 122 within the computing device 102.

FIG. 6-2 illustrates an example arrangement of multiple multi-band mmW antenna array and RFIC modules 120-1 and 120-2 for implementing large linear antenna arrays. In the depicted configuration, the multi-band mmW antenna array and RFIC modules 120-1 and 120-2 are positioned along a horizontal axis such that the multi-band mmW antenna array and RFIC modules 120-1 and 120-2 share the first axis 406-1 and the second axis 406-2. In this manner, the antenna array 124-1 includes the antenna elements 402-1 and 402-2 of the multi-band mmW antenna array and RFIC module 120-1 and antenna elements 402-3 and 402-4 of the multi-band mmW antenna array and RFIC module 120-2. Likewise, the antenna array 124-2 includes the antenna elements 404-1 to 404-4 of the multi-band mmW antenna array and RFIC module 120-2 and antenna elements 404-5 to 404-8 of the multi-band mmW antenna array and RFIC module 120-2.

A distance between the multi-band mmW antenna array and RFIC modules 120-1 and 120-2 can enable the antenna arrays 124-1 and 124-2 to be implemented as uniform linear antenna arrays. For example, the multi-band mmW antenna array and RFIC modules 120-1 and 120-2 are arranged such that the antenna elements 402-2 and 402-3 are separated by the element spacing 408-1 and the antenna elements 404-4 and 404-5 are separated by the element spacing 408-2. In some aspects, components within the multi-band mmW antenna array and RFIC module 120-1 and the multi-band mmW antenna array and RFIC module 120-2 can be symmetrically arranged with respect to an inter-module axis of symmetry that is between the axes of symmetry 522-1 and 522-2 and is approximately parallel to the axes of symmetry 522-1 and 522-2.

FIG. 6-3 illustrates an example arrangement of the multiple multi-band mmW antenna array and RFIC modules 120-1 and 120-2 for implementing two-dimensional antenna arrays. In the depicted configuration, the multi-band mmW antenna array and RFIC modules 120-1 and 120-2 are positioned along a vertical axis such that the multi-band mmW antenna array and RFIC modules 120-1 and 120-2 share the axis of symmetry 522. Similar to FIG. 6-2, the antenna array 124-1 includes the antenna elements 402-1 to 402-4. However, while the antenna elements 402-1 and 402-2 are arranged along the first axis 406-1, the antenna elements 402-3 and 402-4 are arranged along a third axis 406-3. In this way, the antenna elements 402-1 to 402-4 implement a two-dimensional array instead of the linear array shown in FIG. 6-2. Likewise, the antenna array 124-2 is shown to be implemented with a two-dimensional array including the antenna elements 404-1 to 404-8. The antenna elements 404-1 to 404-4 are arranged along the second axis 406-2 while the antenna elements 404-5 to 404-8 are arranged along a fourth axis 406-4.

In general, the first axis 406-1, the second axis 406-2, the third axis 406-3, and the fourth axis 406-4 are approximately parallel with one another. In some cases, a vertical distance between the first axis 406-1 and the third axis 406-3 can be approximately equal to the element spacing 408-1, and the vertical distance between the second axis 406-2 and the fourth axis 406-4 can be approximately equal to the element spacing 408-2, as shown. In some aspects, components within the multi-band mmW antenna array and RFIC module 120-1 and the multi-band mmW antenna array and RFIC module 120-2 can be symmetrically arranged with respect to an inter-module axis of symmetry that is between the second axis 406-2 and the fourth axis 406-4, and is approximately parallel to the axes 406-2 and 406-4.

By using multiple multi-band mmW antenna array and RFIC modules 120 to implement large antenna arrays as described herein, routing lengths between the antenna elements 402-1 to 402-4 and the radio-frequency front-end integrated circuits 122-1 and 122-2 within the multi-band antenna array and RFIC modules 120-1 and 120-2 can be made relatively similar compared to a single multi-band antenna array and RFIC module that couples larger quantities of antenna elements to a single radio-frequency front-end integrated circuit 122. This is because the antenna elements 402-1 to 402-4 or 404-1 to 404-8 are similarly distanced from the associated radio-frequency front-end integrated circuits 122-1 and 122-2. Additionally, this modular design allows simplified routing interconnections between the antenna arrays 124-1 and 124-2 and the radio-frequency front-end integrated circuits 122-1 to 122-2 within the computing device 102. Example routings are further described with respect to FIGS. 7-1 to 7-3.

FIG. 7-1 illustrates an example routing for a multi-band mmW antenna array and RFIC module including dual-polarized patch antenna elements and the radio-frequency front-end integrated circuit 122 of FIG. 5-2. In the depicted configuration, the antenna elements 402-1 to 402-2 and 404-1 to 404-4 of the respective antenna arrays 124-1 and 124-2 comprise dual-polarized patch antenna elements 424 of FIG. 4-3. Within the radio-frequency front-end integrated circuit 122, the first polarization 520-1 is a vertical polarization represented by a letter V and the second polarization 520-2 is a horizontal polarization represented by a letter H. The eight transceiver chains 516-1 to 518-4 are located on a side of the radio-frequency front-end integrated circuit 122 that is closer to the second antenna array 124-2 as compared to an opposite side along which the four transceiver chains 506-1 to 508-2 are located.

With the symmetrical arrangements of the feed ports 412 and 416 and the twelve transceiver chains 506-1 to 508-2 and 516-1 to 518-4, traces within the multi-band mmW antenna array and RFIC module 120 can be disposed in a same metal layer. In other words, the traces can be designed and laid out such that there are no cross-overs or vias within the multi-band mmW antenna array and RFIC module 120, at least for the routings between feed ports and transceiver chains.

Lengths of the traces may be similar or different between different antenna elements 402-1 and 402-2 or 404-1 to 404-4 of the antenna arrays 124-1 and 124-2, respectively, and the radio-frequency front-end integrated circuit 122. In some cases, a subset of the traces can be designed to have relatively similar lengths. If these traces couple multiple antenna elements that are located at different distances from the axis of symmetry 522 (e.g., such as the traces that couple the horizontally-polarized feed ports 412 of the antenna elements 404-3 and 404-4 to the transceiver chains 518-3 and 518-4, respectively), some of the traces can be designed to have one or more short meanders to compensate for the different distances and cause the lengths of the traces to be relatively similar. By having the lengths of the traces be relatively similar, signals that propagate along the traces have relatively equal delays. Alternatively, if the lengths of the traces are relatively different, signals that propagate along the traces have relatively different delays. In this case, the phase shifters 530 within any one of the associated twelve transceiver chains 506-1 to 508-2 or 516-1 to 518-4 can partially or wholly compensate for the differences in lengths.

In some instances, the lengths of the traces can be symmetrical about the axis of symmetry (e.g., a length of a trace between the horizontally-polarized feed port 412 of the antenna element 404-1 and the transceiver chain 518-1 is approximately equal to a length of a trace between the horizontally-polarized feed port 412 of the antenna element 404-4 and the transceiver chain 518-4). Sometimes, paths (e.g., geometric shapes or patterns) of the traces can also be symmetrical about the axis of symmetry.

FIG. 7-2 illustrates another example routing for the multi-band mmW antenna array and RFIC module 120 including dual-polarized cross-patch antenna elements and the radio-frequency front-end integrated circuit 122 of FIG. 5-2. Similar to FIG. 7-1, the multi-band mmW antenna array and RFIC module 120 in FIG. 7-2 includes the antenna array 124-2 implemented using dual-polarized patch antenna elements 424 and the radio-frequency front-end integrated circuit 122 of FIG. 5-2. The antenna elements 402-1 to 402-2 of the antenna array 124-1, however, are implemented using cross-patch antenna elements 426 of FIG. 4-3. By using cross-patch antenna elements 426, a vertical spacing between the antenna arrays 124-1 and 124-2 can be reduced relative to the multi-band mmW antenna array and RFIC module 120 of FIG. 7-1 to conserve space. Similar to FIG. 7-1, the traces can be approximately symmetrical in length or path with respect to the axis of symmetry 522.

FIG. 7-3 illustrates an example routing for a multi-band mmW antenna array and RFIC module 120 including single-polarized patch antenna elements and the radio-frequency front-end integrated circuit 122 of FIG. 5-3. Similar to FIG. 7-2, the multi-band mmW antenna array and RFIC module 120 includes the antenna array 124-1 implemented using dual-polarized cross-patch antenna elements 426. The four antenna elements 404-1 to 404-4 of the antenna array 124-2, however, comprise two rows of single-polarized antenna elements. In the depicted configuration, the antenna array 124-2 comprises a linear array of four horizontally-polarized patch antenna elements 418-1 to 418-4 and another linear array of four vertically-polarized patch antenna elements 420-1 to 420-4. In general, each of the antenna elements 404-1 to 404-4 in FIG. 7-2 are implemented as a pair of antenna elements of alternate polarizations. For example, the antenna element 404-1 (of FIG. 7-2) comprises the pair of antenna elements 418-1 and 420-1 in FIG. 7-3, the antenna element 404-2 comprises the pair of antenna elements 418-2 and 420-2, the antenna element 404-3 comprises the pair of antenna elements 418-3 and 420-3, and the antenna element 404-4 comprises the pair of antenna elements 418-4 and 420-4.

In this example, the four transceiver chains 516-1 to 516-4 are associated with the vertical polarization and are coupled to the vertically-polarized antenna elements 420-1 to 420-4. In general, the polarization of the transceiver chains 516-1 to 516-4, which are arranged farther away from the axis of symmetry 522 towards an outer edge of the radio-frequency front-end integrated circuit 122, correspond to the polarization of the single-polarized antenna elements that face an opposite side of the radio-frequency front-end integrated circuit 122 relative to the side the transceiver chains 516-1 to 516-4 are implemented on. Also, the polarization of the four transceiver chains 518-1 to 518-4, which are arranged closer to the axis of symmetry 522 towards a center of the radio-frequency front-end integrated circuit 122, correspond to the polarization of the single-polarized antenna elements that face the side of the radio-frequency front-end integrated circuit 122 that the transceiver chains 518-1 to 518-4 are implemented on. In other implementations, the radio-frequency front-end integrated circuit 122 can be implemented with the radio-frequency front-end integrated circuit 122 of FIG. 5-6 or the horizontally-polarized antenna elements 418-1 to 418-4. Similar to FIG. 7-1, the traces can be approximately symmetrical in length or path with respect to the axis of symmetry 522.

FIG. 7-4 illustrates another example routing for a multi-band mmW antenna array and RFIC module 120 including single-polarized patch antenna elements and the radio-frequency front-end integrated circuit 122 of FIG. 5-4. Similar to FIG. 7-3, the multi-band mmW antenna array and RFIC module 120 includes the antenna array 124-1 implemented using dual-polarized cross-patch antenna elements 426 and the antenna array 124-2 implemented using horizontally-polarized patch antenna elements 418-1 to 418-4 and vertically-polarized patch antenna elements 420-1 to 420-4. In the depicted configuration, the radio-frequency front-end integrated circuit 122 of FIG. 5-4 is arranged vertically along the axis of symmetry 522 such that the axes 500-1 and 500-2 are approximately parallel to the axis of symmetry 522. With this configuration, the traces can be disposed on a same metal layer without any cross overs, as shown in FIG. 7-4.

FIG. 7-5 illustrates an example routing for a multi-band mmW antenna array and RFIC module 120 including single-polarized patch antenna elements and the radio-frequency front-end integrated circuit 122 of FIG. 5-7. Similar to FIGS. 7-3 and 7-4, the multi-band mmW antenna array and RFIC module 120 includes the antenna array 124-1 implemented using dual-polarized cross-patch antenna elements 426 and the antenna array 124-2 implemented using horizontally-polarized patch antenna elements 418-1 to 418-4 and vertically-polarized patch antenna elements 420-1 to 420-4. The radio-frequency front-end integrated circuit 122 of FIG. 5-7 is also arranged vertically along the axis of symmetry 522 similar to FIG. 7-4. With this configuration, the traces can be disposed on a same metal layer without any cross overs, as shown in FIG. 7-5.

FIG. 8-1 illustrates an example implementation of a multi-band mmW antenna array and RFIC module 120 having multiple radio-frequency front-end integrated circuits 122-1 and 122-2. In the depicted configuration, the multiple radio-frequency front-end integrated circuits 122-1 and 122-2 are associated with different mmW frequency bands 210-1 and 210-2. Example arrangements of the four transceiver chains 506-1 to 508-2 and the eight transceiver chains 516-1 to 518-4 within the radio-frequency front-end integrated circuit 122-1 and 122-2 are shown at a top of FIG. 8-1. Although the radio-frequency front-end integrated circuits 122-1 and 122-2 are associated with a single mmW frequency band 210-1 and 210-2, respectively, the arrangement of the transceiver chains 506-1 to 508-2 and 516-1 to 518-4 can have similar characteristics as described with respect to FIGS. 5-1 and 5-5.

In this example, the twelve total transceiver chains of the transceiver chains 506-1 to 508-2 and 516-1 to 518-4 are arranged along axes that are approximately parallel to the axes 406-1 and 406-2. In other implementations, the transceiver chains 506-1 to 508-2 or 516-1 to 518-4 can be arranged along axes that are approximately perpendicular to the axes 406-1 and 406-2. The traces are not explicitly shown in FIG. 8-1 but can have similar characteristics as described with respect to FIG. 7-1. The radio-frequency front-end integrated circuits 122-1 and 122-2 can be spaced apart from one another along the axis of symmetry 522 to allow for the traces to connect to the transceiver chains 506-1 to 508-2 and 516-1 to 518-4.

FIG. 8-2 illustrates another example implementation of the multi-band mmW antenna array and RFIC module 120 having multiple radio-frequency front-end integrated circuits 122-1 and 122-2. In the depicted configuration, the antenna array 124-1 includes antenna elements 402-1 to 402-4 and the antenna array 124-2 includes antenna elements 404-1 to 404-8. In this example, the antenna elements 404-1 and 404-5 have horizontally-polarized feed ports 412 that are facing towards the radio-frequency front-end integrated circuit 122-2. Alternatively, the antenna elements 404-1 and 404-5 can be designed to have the horizontally-polarized feed ports 412 face away from the radio-frequency front-end integrated circuit 122-2. Example arrangements of the eight transceiver chains 506-1 to 508-4 and the sixteen transceiver chains 516-1 to 518-8 within the radio-frequency front-end integrated circuit 122-1 and 122-2 are shown at a top of FIG. 8-2. Similar to FIG. 8-1, the arrangement of the twenty-four total transceiver chains of the transceiver chains 506-1 to 508-4 and 516-1 to 518-8 can have similar characteristics as described with respect to FIGS. 5-1 and 5-5 and the traces, which are not explicitly shown in FIG. 8-1, can have similar characteristics as described with respect to FIG. 7-1.

Figure 9:
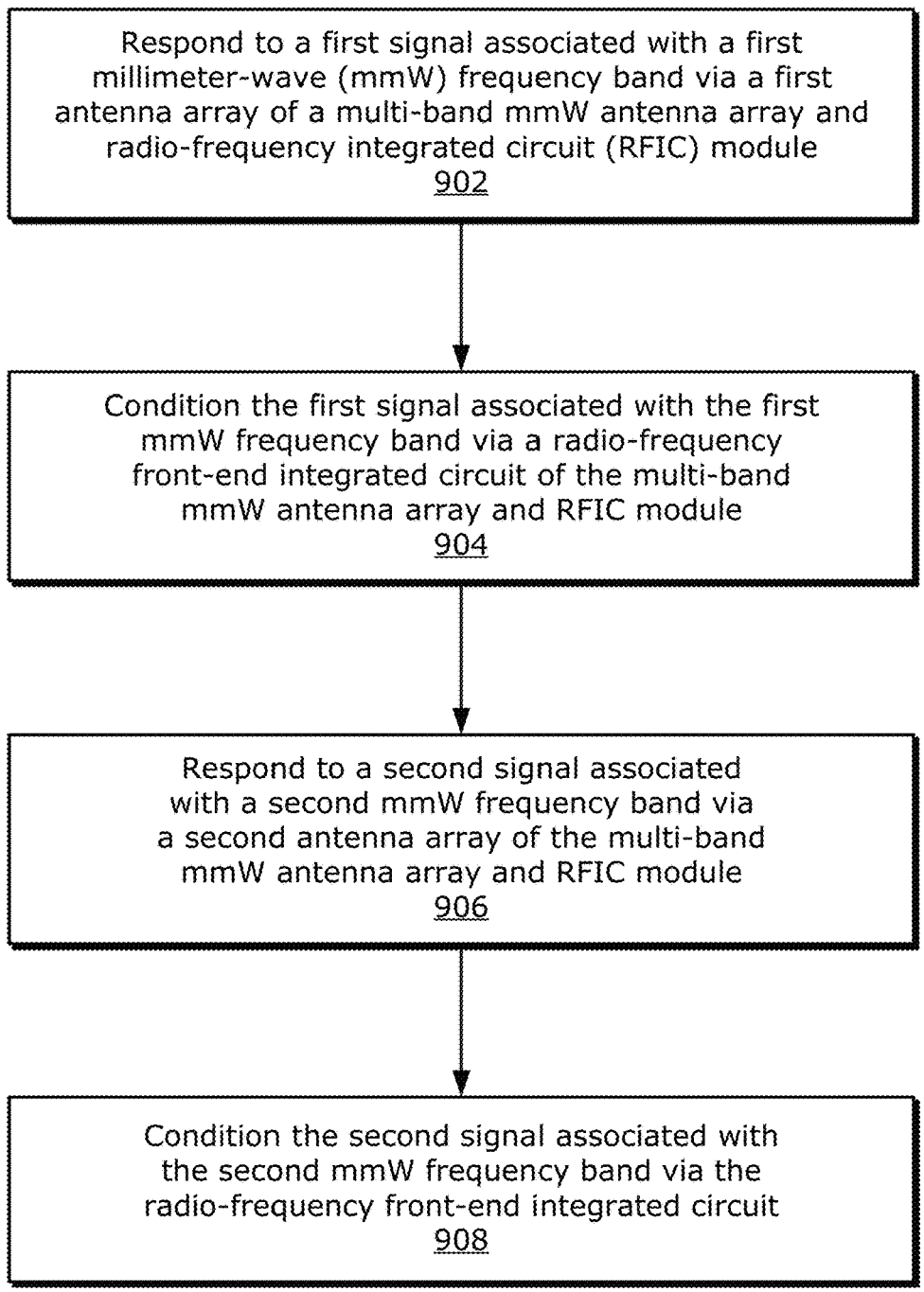
FIG. 9 is a flow diagram illustrating an example process for operating a multi-band mmW antenna array and RFIC module.

FIG. 9 is a flow diagram illustrating an example process 900 for operating a multi-band mmW antenna array and RFIC module. The process 900 is described in the form of a set of blocks 902-908 that specify operations that can be performed. However, operations are not necessarily limited to the order shown in FIG. 9 or described herein, for the operations may be implemented in alternative orders or in fully or partially overlapping manners. Operations represented by the illustrated blocks of the process 900 may be performed by a multi-band mmW antenna array and RFIC module 120 (e.g., of FIG. 3 or 7-1 to 7-3). More specifically, the operations of the process 900 may be performed by a radio-frequency front-end integrated circuit 122 (e.g., of FIGS. 5-1 to 5-8) and antenna arrays 124-1 and 124-2 (e.g., of FIG. 4-1).

At block 902, a first signal associated with a first mmW frequency band is responded to via a first antenna array of a multi-band mmW antenna array and RFIC module. For example, the first antenna array 124-1 of the multi-band mmW antenna array and RFIC module 120 can respond to the first signal 208-1 associated with the mmW frequency band 210-1 by transmitting or receiving the first signal 208-1. As such, the first signal 208-1 may represent an uplink signal that is transmitted to the base station 104 or a downlink signal that is received from the base station 104. As an example, the mmW frequency band 210-1 may be a licensed low mmW frequency band that includes frequencies between 24 and 30 GHz. The first antenna array 124-1 may comprise dual-polarized antenna elements 422, horizontally-polarized antenna elements 410, vertically-polarized antenna elements 414, or a combination thereof.

At block 904, the first signal associated with the first mmW frequency band is conditioned via a radio-frequency front-end integrated circuit of the multi-band mmW antenna array and RFIC module. For example, the radio-frequency front-end integrated circuit 122 of the multi-band mmW antenna array and RFIC module 120 can condition the first signal 208-1 by generating or processing the first signal 208-1 that is transmitted or received via the first antenna array 124-1. In general, the radio-frequency front-end integrated circuit 122 conditions the first signal 208-1 by amplifying, phase-shifting, filtering, upconverting, or downconverting the first signal 208-1. The radio-frequency front-end integrated circuit 122 can include at least two transceiver chains 502-1 to 502-N, as shown in FIGS. 5-1 and 5-5. Multiple versions of the first signal 208-1 (e.g., multiple phase-shifted signals) can propagate between the first antenna array 124-1 and the radio-frequency front-end integrated circuit 122 along traces that can be substantially symmetrical, as shown in FIGS. 7-1 to 7-3.

At block 906 a second signal associated with a second mmW frequency band is responded to via a second antenna array of the multi-band mmW antenna array and RFIC module. For example, the second antenna array 124-2 of the multi-band mmW antenna array and RFIC module 120 responds to the second signal 208-2 associated with the second mmW frequency band 210-2 by transmitting or receiving the second signal 208-2. As such, the second signal 208-2 may represent an uplink signal or a downlink signal. As an example, the second mmW frequency band 210-2 may be an unlicensed high mmW frequency band that includes frequencies between 48 and 60 GHz. In general, the mmW frequency band 210-2 has a bandwidth or center frequency that differs from that of the mmW frequency band 210-1. The second antenna array 124-2 may comprise dual-polarized antenna elements 422, horizontally-polarized antenna elements 410, vertically-polarized antenna elements 414, or a combination thereof.

At block 908, the second signal associated with the second mmW frequency band is conditioned via the radio-frequency front-end integrated circuit. For example, the radio-frequency front-end integrated circuit 122 can condition the second signal 208-2 by generating or processing the second signal 208-2 that is transmitted or received via the second antenna array 124-2. The radio-frequency front-end integrated circuit 122 can include at least two transceiver chains 512-1 to 512-N, as shown in FIGS. 5-1 and 5-5. In other implementations, the second signal can be conditioned by a different radio-frequency front-end integrated circuit. For example, the radio-frequency front-end integrated circuit 122-1 of FIGS. 8-1 and 8-2 can condition the first signal 208-1 while the radio-frequency front-end integrated circuit 122-2 can condition the second signal 208-2. Multiple versions of the second signal 208-2 (e.g., multiple phase-shifted signals) can propagate between the second antenna array 124-2 and the radio-frequency front-end integrated circuit 122 along traces that can be substantially symmetrical, as shown in FIGS. 7-1 to 7-3.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:
1. An apparatus comprising:
a multi-band millimeter-wave (mmW) antenna array and radio-frequency integrated circuit (RFIC) module including:
  a substrate;
  a first antenna array disposed on the substrate and including at least two first antenna elements, the first antenna array tuned to a first mmW frequency band;
  a second antenna array disposed on the substrate and including at least two second antenna elements, the second antenna array tuned to a second mmW frequency band; and
  at least one radio-frequency front-end integrated circuit disposed on the substrate, the at least one radio-frequency front-end integrated circuit including:
    at least two first transceiver chains that are respectively coupled to the at least two first antenna elements; and
    at least two second transceiver chains that are respectively coupled to the at least two second antenna elements.

2. The apparatus of claim 1, wherein the multi-band mmW antenna array and RFIC module includes multiple traces disposed in a same metal layer, a subset of the multiple traces respectively coupling the at least two first antenna elements to the at least two first transceiver chains, and another subset of the multiple traces respectively coupling the at least two second antenna elements to the at least two second transceiver chains.

3. The apparatus of claim 2, wherein:
the at least two first antenna elements of the first antenna array respectively have first feed ports associated with a first polarization and second feed ports associated with a second polarization;
the at least two first transceiver chains include at least four first transceiver chains; and
the subset of the multiple traces:
  couple two transceiver chains of the at least four first transceiver chains to the first feed ports associated with the first polarization with substantially similar routing lengths; and
  couple two other transceiver chains of the at least four first transceiver chains to the second feed ports associated with the second polarization with other substantially similar routing lengths.

4. The apparatus of claim 2, wherein:
the at least two first antenna elements of the first antenna array respectively have first feed ports associated with a first polarization;
the subset of the multiple traces couple the at least two first transceiver chains to the first feed ports associated with the first polarization with different routing lengths; and
at least one transceiver chain of the at least two first transceiver chains includes a phase shifter having a phase shift based on a difference between the different routing lengths.

5. The apparatus of claim 1, wherein:
the at least two first antenna elements of the first antenna array are positioned along a first axis and adjacent elements of the at least two first antenna elements are separated by approximately half a first center wavelength associated with the first mmW frequency band; and
the at least two second antenna elements of the second antenna array are positioned along a second axis, which is approximately parallel to the first axis, and other adjacent elements of the at least two second antenna elements are separated by approximately half a second center wavelength associated with the second mmW frequency band.

6. The apparatus of claim 5, wherein:
the at least two first antenna elements of the first antenna array each respectively have first feed ports associated with a first polarization and second feed ports associated with a second polarization; and
an order of the first feed ports and the second feed ports along a direction of the first axis is symmetrical about an axis of symmetry, the axis of symmetry being approximately perpendicular to both the first axis and the second axis.

7. The apparatus of claim 6, wherein:
the at least two second antenna elements of the second antenna array each respectively have first feed ports associated with the first polarization and second feed ports associated with the second polarization; and
an order of the first feed ports of the at least two second antenna elements and the second feed ports of the at least two second antenna elements along a direction of the second axis is symmetrical about the axis of symmetry.

8. The apparatus of claim 5, wherein:
the first center wavelength is greater than the second center wavelength; and
the radio-frequency front-end integrated circuit is located between the at least two first antenna elements.

9. The apparatus of claim 8, wherein:
the at least two first transceiver chains are positioned along a third axis that is approximately parallel to the first axis;
the at least two second transceiver chains are positioned along a fourth axis that is approximately parallel to the third axis; and
the at least two second transceiver chains are positioned along a side of the radio-frequency front-end integrated circuit that is closer to the second antenna array compared to an opposite side of the radio-frequency front-end integrated circuit.

10. The apparatus of claim 9, wherein:
the at least two first transceiver chains include:
  two first transceiver chains coupled to first feed ports of the at least two first antenna elements, the first feed ports associated with a first polarization; and
  another two first transceiver chains coupled to second feed ports of the at least two first antenna elements, the second feed ports associated with a second polarization; and
an order of the two first transceiver chains and the other two first transceiver chains along a direction of the third axis is symmetrical about an axis of symmetry, the axis of symmetry being approximately perpendicular to both the third axis and the fourth axis.

11. The apparatus of claim 10, wherein:
the at least two second transceiver chains include:
  two second transceiver chains coupled to first feed ports of the at least two second antenna elements, the first feed ports of the at least two second antenna elements associated with the first polarization; and
  another two second transceiver chains coupled to second feed ports of the at least two second antenna elements, the second feed ports of the at least two second antenna elements associated with the second polarization; and an order of the two second transceiver chains and the other two second transceiver chains along a direction of the fourth axis is symmetrical about the axis of symmetry.

12. The apparatus of claim 1, wherein:
the at least two first antenna elements of the first antenna array comprise at least two dual-polarized antenna elements; and
the at least two second antenna elements of the second antenna array comprise at least two other dual-polarized antenna elements.

13. The apparatus of claim 12, wherein:
the at least two dual-polarized antenna elements of the first antenna array comprise at least two dual-polarized cross-patch antenna elements; and
the at least two other dual-polarized antenna elements of the second antenna array comprise at least two dual-polarized patch antenna elements.

14. The apparatus of claim 1, wherein:
the at least two first antenna elements of the first antenna array comprise at least two dual-polarized antenna elements; and
the at least two second antenna elements of the second antenna array comprise at least four single-polarized antenna elements.

15. The apparatus of claim 14, wherein:
the at least two first antenna elements of the first antenna array are positioned along a first axis;
a subset of the at least four single-polarized antenna elements of the second antenna array that are associated with a first polarization are positioned along a second axis that is approximately parallel to the first axis; and
another subset of the at least four single-polarized antenna elements of the second antenna array that are associated with a second polarization are positioned along a third axis that is approximately parallel to the second axis, the third axis positioned on an opposite side of the first axis relative to the second axis.

16. The apparatus of claim 1, wherein:
a quantity of the at least two second antenna elements is twice a quantity of the at least two first antenna elements; and
a quantity of the at least two second transceiver chains is twice a quantity of the at least two first transceiver chains.

17. The apparatus of claim 1, wherein the second mmW frequency band includes a frequency that is approximately twice another frequency that is within the first mmW frequency band.

18. The apparatus of claim 1, wherein:
the first mmW frequency band comprises a licensed mmW frequency band; and
the second mmW frequency band comprises an unlicensed mmW frequency band.

19. The apparatus of claim 1, further comprising:
another multi-band mmW antenna array and RFIC module including:
  another substrate;
  a third antenna array disposed on the other substrate and including at least two third antenna elements, the third antenna array tuned to the first mmW frequency band;
  a fourth antenna array disposed on the other substrate and including at least two fourth antenna elements, the fourth antenna array tuned to the second mmW frequency band; and
  at least another radio-frequency front-end integrated circuit disposed on the other substrate, the other radio-frequency front-end integrated circuit including:
    at least two third transceiver chains that are respectively coupled to the at least two third antenna elements; and
    at least two fourth transceiver chains that are respectively coupled to the at least two fourth antenna elements.

20. The apparatus of claim 19, wherein:
the at least two first antenna elements of the first antenna array and the at least two third antenna elements of the third antenna array are positioned along a first axis;
adjacent antenna elements of the at least two first antenna elements and the at least two third antenna elements are separated by approximately half a first center wavelength associated with the first mmW frequency band;
the at least two second antenna elements of the second antenna array and the at least two fourth antenna elements of the fourth antenna array are positioned along a second axis that is approximately parallel to the first axis; and
other adjacent antenna elements of the at least two second antenna elements and the at least two fourth antenna elements are separated by approximately half a second center wavelength associated with the second mmW frequency band.

21. The apparatus of claim 19, wherein:
the at least two first antenna elements of the first antenna array are positioned along a first axis;
the at least two second antenna elements of the second antenna array are positioned along a second axis;
the at least two third antenna elements of the third antenna array are positioned along a third axis that is approximately parallel to the first axis, the third axis offset from the first axis by approximately half a first center wavelength associated with the first mmW frequency band;
the at least two fourth antenna elements of the fourth antenna array are positioned along a fourth axis that is approximately parallel to the second axis, the fourth axis offset from the second axis by approximately half a second center wavelength associated with the second mmW frequency band;
adjacent elements of the at least two first antenna elements of the first antenna array and the at least two third antenna elements of the third antenna array are separated by approximately half the first center wavelength along two dimensions; and
other adjacent elements of the at least two second antenna elements of the second antenna array and the at least two fourth antenna elements of the fourth antenna array are separated by approximately half the second center wavelength along two dimensions.

22. An apparatus comprising:
a multi-band millimeter-wave (mmW) antenna array and radio-frequency integrated circuit (RFIC) module including:
  a substrate;
  a first antenna array disposed on the substrate and configured to respond to first signals associated with a first mmW frequency band;
  a second antenna array disposed on the substrate and configured to respond to second signals associated with a second mmW frequency band; and a radio-frequency front-end integrated circuit disposed on the substrate and coupled to the first antenna array and the second antenna array, the radio-frequency front-end integrated circuit including:
first partition means for conditioning the first signals associated with the first mmW frequency band; and
second partition means for conditioning the second signals associated with the second mmW frequency band.

23. The apparatus of claim 22, further comprising trace means for coupling the first antenna array to the first partition means and coupling the second antenna array to the second partition means in a same metal layer.

24. The apparatus of claim 23, wherein the trace means comprises means for routing the first signals between the first antenna array and the first partition means with relatively equal delays.

25. The apparatus of claim 23, further comprising phase-shifting means for adjusting relative phase shifts within the first partition means based on relatively different delays, and
wherein the trace means comprises means for routing the first signals between the first antenna array and the first partition means with the relatively different delays.

26. The apparatus of claim 22, wherein the first antenna array and the second antenna array have respective feed ports that are ordered in a symmetrical fashion about an axis of symmetry.

27. The apparatus of claim 22, wherein:
the first partition means and the second partition means each include radio-frequency integrated circuit ports associated with a first polarization and radio-frequency integrated circuit ports associated with a second polarization; and
the radio-frequency integrated circuit ports associated with the first polarization and the radio-frequency integrated circuit ports associated with the second polarization are ordered in a symmetrical fashion about an axis of symmetry.

28. A method for operating a multi-band millimeter-wave (mmW) antenna array and radio-frequency integrated circuit (RFIC) module, the method comprising:
responding to a first signal associated with a first mmW frequency band via a first antenna array of the multi-band mmW antenna array and RFIC module, the first antenna array disposed on a substrate of the multi-band mmW antenna array and RFIC module;
conditioning the first signal associated with the first mmW frequency band via a radio-frequency front-end integrated circuit of the multi-band mmW antenna array and RFIC module, the radio-frequency front-end integrated circuit disposed on the substrate of the multi-band mmW antenna array and RFIC module;
responding to a second signal associated with a second mmW frequency band via a second antenna array of the multi-band mmW antenna array and RFIC module the second antenna array disposed on the substrate of the multi-band mmW antenna array and RFIC module; and
conditioning the second signal associated with the second mmW frequency band via the radio-frequency front-end integrated circuit.

29. The method of claim 28, further comprising:
propagating multiple versions of the first signal between the first antenna array and the radio-frequency front-end integrated circuit using substantially symmetrical traces of the multi-band mmW antenna array and RFIC module; and
propagating multiple versions of the second signal between the second antenna array and the radio-frequency front-end integrated circuit using other substantially symmetrical traces of the multi-band mmW antenna array and RFIC module.

30. An apparatus comprising:
a multi-band millimeter-wave (mmW) antenna array and radio-frequency integrated circuit (RFIC) module including:
a substrate;
a first antenna array disposed on the substrate and including at least two first antenna elements, the first antenna array tuned to a first mmW frequency band;
a second antenna array disposed on the substrate and including at least two second antenna elements, the second antenna array tuned to a second mmW frequency band;
a first radio-frequency front-end integrated circuit disposed on the substrate and including at least two first transceiver chains that are respectively coupled to the at least two first antenna elements; and
a second radio-frequency front-end integrated circuit disposed on the substrate and including at least two second transceiver chains that are respectively coupled to the at least two second antenna elements.

* * * * *